US009600566B2

(12) United States Patent
Ganti et al.

(10) Patent No.: US 9,600,566 B2
(45) Date of Patent: Mar. 21, 2017

(54) IDENTIFYING ENTITY SYNONYMS

(75) Inventors: Venkatesh Ganti, Palo Alto, CA (US); Dong Xin, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 151 days.

(21) Appl. No.: 12/779,964

(22) Filed: May 14, 2010

(65) Prior Publication Data

US 2011/0282856 A1    Nov. 17, 2011

(51) Int. Cl.
G06F 17/00 (2006.01)
G06F 17/30 (2006.01)
G06F 17/27 (2006.01)

(52) U.S. Cl.
CPC .... G06F 17/30684 (2013.01); G06F 17/2795 (2013.01)

(58) Field of Classification Search
CPC ........................ G06F 17/30864; G06F 17/2795
USPC ........................... 707/999.005, 999.002, 749
See application file for complete search history.

(56) References Cited

U.S. PATENT DOCUMENTS

| | | |
|---|---|---|
| 5,297,039 A | 3/1994 | Kanaegami et al. |
| 5,418,948 A | 5/1995 | Turtle |
| 5,469,355 A | 11/1995 | Tsuzuki |
| 5,717,913 A | 2/1998 | Driscoll |
| 5,805,911 A | 9/1998 | Miller |
| 5,926,808 A | 7/1999 | Evans et al. |
| 6,006,225 A | 12/1999 | Bowman et al. |
| 6,012,055 A | 1/2000 | Campbell et al. |
| 6,098,034 A | 8/2000 | Razin et al. |
| 6,128,613 A | 10/2000 | Wong et al. |
| 6,137,911 A | 10/2000 | Zhilyaev |
| 6,269,368 B1 | 7/2001 | Diamond |

(Continued)

FOREIGN PATENT DOCUMENTS

| | | |
|---|---|---|
| CN | 101354707 A | 1/2009 |
| CN | 101785000 A | 7/2010 |

(Continued)

OTHER PUBLICATIONS

Kim et al., "A comparison of collocation-based similarity measures in query expansion", 1999, Information Processing and Management, Elsevier Science Ltd.*

(Continued)

Primary Examiner — Mariela Reyes
Assistant Examiner — Mohsen Almani
(74) Attorney, Agent, or Firm — Rainier Patents, P.S.

(57) ABSTRACT

Embodiments for identifying an entity synonym of an entity are described. A query log is stored in a database located on at least one computing device. A candidate generation module can select a candidate query in the query log that shares a click on a URL with the entity. A correlated tag module can generate a set of phrase-tag pairs for the entity and the candidate query and measure a mutual information value for each phrase-tag pair. A candidate filtering module can determine a click similarity value between the candidate query and the entity based on a set of URLs selected in the search engine results and a tag similarity value based on the mutual information values. A candidate query is selected as an entity synonym if the click similarity value and the tag similarity value are greater than predetermined thresholds respectively.

20 Claims, 4 Drawing Sheets

(56) References Cited

U.S. PATENT DOCUMENTS

| | | |
|---|---|---|
| 6,278,967 B1 | 8/2001 | Akers |
| 6,363,377 B1 | 3/2002 | Kravets et al. |
| 6,370,527 B1 | 4/2002 | Singhal |
| 6,377,945 B1 | 4/2002 | Risvik |
| 6,510,406 B1 | 1/2003 | Marchisio |
| 6,571,240 B1 | 5/2003 | Ho et al. |
| 6,675,159 B1 | 1/2004 | Lin et al. |
| 6,697,818 B2 | 2/2004 | Li et al. |
| 6,711,577 B1 | 3/2004 | Wong et al. |
| 6,804,677 B2 | 10/2004 | Shadmon et al. |
| 6,876,963 B1 | 4/2005 | Miyahira et al. |
| 7,024,624 B2 | 4/2006 | Hintz |
| 7,080,068 B2 | 7/2006 | Leitermann |
| 7,149,746 B2 | 12/2006 | Fagin et al. |
| 7,254,530 B2 | 8/2007 | Klavans et al. |
| 7,254,774 B2 | 8/2007 | Cucerzan et al. |
| 7,293,003 B2 | 11/2007 | Horton |
| 7,296,011 B2 | 11/2007 | Chaudhuri et al. |
| 7,330,811 B2 | 2/2008 | Turcato et al. |
| 7,340,466 B2 | 3/2008 | Odom et al. |
| 7,346,490 B2 | 3/2008 | Fass et al. |
| 7,440,941 B1 | 10/2008 | Borkovsky et al. |
| 7,483,829 B2 | 1/2009 | Murakami et al. |
| 7,526,425 B2 | 4/2009 | Marchisio et al. |
| 7,552,112 B2 | 6/2009 | Jhala et al. |
| 7,617,202 B2 | 11/2009 | Brill et al. |
| 7,627,548 B2 | 12/2009 | Riley et al. |
| 7,634,462 B2 * | 12/2009 | Weyand et al. |
| 7,636,714 B1 * | 12/2009 | Lamping et al. |
| 7,707,047 B2 | 4/2010 | Hasan et al. |
| 7,778,817 B1 | 8/2010 | Liu et al. |
| 7,809,548 B2 | 10/2010 | Mihalcea et al. |
| 7,860,853 B2 | 12/2010 | Ren et al. |
| 7,877,343 B2 | 1/2011 | Cafarella et al. |
| 7,890,521 B1 | 2/2011 | Grushetskyy et al. |
| 7,890,526 B1 | 2/2011 | Brewer et al. |
| 7,917,355 B2 | 3/2011 | Wu et al. |
| 7,958,489 B2 | 6/2011 | Meijer et al. |
| 8,239,751 B1 | 8/2012 | Rochelle et al. |
| 8,332,333 B2 | 12/2012 | Agarwal |
| 8,417,713 B1 | 4/2013 | Blair-Goldensohn et al. |
| 8,429,099 B1 | 4/2013 | Perkowitz et al. |
| 8,577,907 B1 | 11/2013 | Singhal et al. |
| 2001/0042080 A1 | 11/2001 | Ross |
| 2002/0103793 A1 | 8/2002 | Koller et al. |
| 2002/0123882 A1 | 9/2002 | Mohammed |
| 2002/0169755 A1 | 11/2002 | Framroze et al. |
| 2002/0178005 A1 | 11/2002 | Dusan |
| 2003/0004716 A1 | 1/2003 | Haigh et al. |
| 2003/0033288 A1 | 2/2003 | Shanahan et al. |
| 2003/0120651 A1 | 6/2003 | Bernstein et al. |
| 2003/0195877 A1 | 10/2003 | Ford et al. |
| 2005/0021324 A1 | 1/2005 | Brants et al. |
| 2005/0060312 A1 | 3/2005 | Curtiss et al. |
| 2005/0060337 A1 | 3/2005 | Chou et al. |
| 2005/0060643 A1 | 3/2005 | Glass et al. |
| 2005/0080613 A1 | 4/2005 | Colledge et al. |
| 2005/0086592 A1 | 4/2005 | Polanyi et al. |
| 2005/0114322 A1 | 5/2005 | Melman |
| 2005/0149494 A1 | 7/2005 | Lindh et al. |
| 2005/0216443 A1 | 9/2005 | Morton et al. |
| 2005/0216444 A1 | 9/2005 | Ritter et al. |
| 2006/0026128 A1 | 2/2006 | Bier |
| 2006/0031207 A1 | 2/2006 | Bjarnestam et al. |
| 2006/0069589 A1 | 3/2006 | Nigam et al. |
| 2006/0089927 A1 | 4/2006 | Bandyopadhyay et al. |
| 2006/0136405 A1 | 6/2006 | Ducaltel et al. |
| 2006/0195421 A1 | 8/2006 | Kilroy |
| 2006/0206306 A1 | 9/2006 | Cao et al. |
| 2006/0218136 A1 | 9/2006 | Surakka et al. |
| 2006/0253427 A1 | 11/2006 | Wu et al. |
| 2006/0271353 A1 | 11/2006 | Berkan |
| 2007/0011154 A1 | 1/2007 | Musgrove et al. |
| 2007/0011183 A1 | 1/2007 | Langseth et al. |
| 2007/0038663 A1 | 2/2007 | Colando |
| 2007/0043723 A1 | 2/2007 | Bitan et al. |
| 2007/0073745 A1 | 3/2007 | Scott et al. |
| 2007/0094285 A1 | 4/2007 | Agichtein et al. |
| 2007/0100823 A1 | 5/2007 | Inmon |
| 2007/0192085 A1 | 8/2007 | Roulland et al. |
| 2007/0203929 A1 | 8/2007 | Bolivar |
| 2007/0233656 A1 | 10/2007 | Bunescu et al. |
| 2007/0239742 A1 | 10/2007 | Saha et al. |
| 2008/0016040 A1 | 1/2008 | Jones et al. |
| 2008/0021898 A1 | 1/2008 | Hoglund |
| 2008/0077570 A1 | 3/2008 | Tang et al. |
| 2008/0087725 A1 | 4/2008 | Liu |
| 2008/0091660 A1 | 4/2008 | Jang et al. |
| 2008/0097941 A1 | 4/2008 | Agarwal |
| 2008/0109416 A1 | 5/2008 | Williams |
| 2008/0147618 A1 | 6/2008 | Bauche |
| 2008/0154873 A1 | 6/2008 | Redlich et al. |
| 2008/0195601 A1 | 8/2008 | Ntoulas et al. |
| 2008/0275694 A1 | 11/2008 | Varone |
| 2008/0275837 A1 | 11/2008 | Lambov |
| 2009/0044095 A1 | 2/2009 | Berger et al. |
| 2009/0144609 A1 | 6/2009 | Liang et al. |
| 2009/0222434 A1 | 9/2009 | Fothergill |
| 2009/0281970 A1 | 11/2009 | Mika et al. |
| 2009/0282012 A1 | 11/2009 | Konig et al. |
| 2009/0319500 A1 | 12/2009 | Agrawal et al. |
| 2009/0327223 A1 | 12/2009 | Chakrabarti et al. |
| 2010/0004925 A1 | 1/2010 | Ah-Pine et al. |
| 2010/0082657 A1 | 4/2010 | Paparizos |
| 2010/0106677 A1 | 4/2010 | Yu |
| 2010/0121702 A1 | 5/2010 | Steelberg et al. |
| 2010/0250598 A1 | 9/2010 | Brauer et al. |
| 2010/0293179 A1 | 11/2010 | Chaudhuri et al. |
| 2010/0313258 A1 | 12/2010 | Chaudhuri et al. |
| 2011/0029513 A1 | 2/2011 | Morris |
| 2011/0071965 A1 | 3/2011 | Long et al. |
| 2011/0106807 A1 | 5/2011 | Srihari et al. |
| 2011/0125776 A1 | 5/2011 | Roshen et al. |
| 2011/0196670 A1 | 8/2011 | Dang et al. |
| 2011/0213796 A1 | 9/2011 | Kiyota et al. |
| 2011/0302179 A1 | 12/2011 | Agrawal |
| 2011/0307485 A1 | 12/2011 | Udupa et al. |
| 2012/0011115 A1 | 1/2012 | Madhavan et al. |
| 2012/0117078 A1 | 5/2012 | Morton et al. |
| 2012/0150838 A1 | 6/2012 | Yin et al. |
| 2012/0191642 A1 | 7/2012 | George |
| 2012/0259890 A1 | 10/2012 | Danesuk et al. |
| 2013/0166573 A1 | 6/2013 | Vaitheeswaran et al. |
| 2013/0232129 A1 | 9/2013 | Cheng et al. |
| 2013/0346421 A1 | 12/2013 | Wang et al. |
| 2014/0058722 A1 | 2/2014 | Sun et al. |
| 2015/0121290 A1 | 4/2015 | Li et al. |
| 2016/0012036 A1 | 1/2016 | Sun et al. |

FOREIGN PATENT DOCUMENTS

| | | |
|---|---|---|
| CN | 102193970 A | 9/2011 |
| CN | 102306144 A | 1/2012 |
| CN | 102609407 A | 7/2012 |
| WO | 97/40452 A1 | 10/1997 |
| WO | 02/29627 A2 | 4/2002 |
| WO | 2008141583 A1 | 11/2008 |
| WO | 2013/133985 A1 | 9/2013 |

OTHER PUBLICATIONS

Baeza-Yates et. al., "Extracting Semantic Relations fromQuery Logs",Yahoo! Research, KDD'07, Aug. 2007, San Jose, California, USA.*

Booth et al., "Query Sentences as Semantic (Sub) Networks", 2009 IEEE International Conference on Semantic Computing.*

Lee et al., "Query Matching System and Method, and Computer Readable Recording Medium Recording Program for Implementing the Method", WO 2006/123918 A1; PCT /KR2006/00 1890; International Filing Date: May 19, 2006.*

Agrawal, et al.; "Mining Association Rules Between Sets of Items in Large Databases"; Proceedings of the 1993 ACM SIGMOD Conference; Washington, DC; May 1993; pp. 1-10.

(56) References Cited

OTHER PUBLICATIONS

Agrawal, et al.; "Scalable Ad-Hoc Entity Extraction from Text Collections"; VLDB 2008; Aug. 24-30, 2008; Auckland, New Zealand; pp. 945-957.
Aho, et al.; "Efficient String Matching: An Aid to Bibliographic Search"; Association fo Computing Machinery, Inc.; 1975; pp. 333-340.
Arasu, et al.; "Efficient Exact Set-Similarity Joins"; VLDB 2006; Sep. 12-15, 2006; Seoul, Korea; pp. 918-929.
Bohn, C.; "Extracting Named Entities and Synonyms from Wikipedia for use in News Search"; Norwegian University of Science and Technology, Department of Computer and Information Science; Jun. 2008; 95 pages.
Chakrabarti, et al.; "An Efficient Filter for Approximate Membership Checking"; SIGMOD 2008; Jun. 9-12, 2008; Vancouver, BC, Canada; pp. 805-817.
Chandel, et al.; "Efficient Batch Top-k Search for Dictionary-based Entity Recognition"; Proceedings of the $22^{nd}$ International Conference on Data Engineering; Apr. 3-7, 2006; pp. 1-10.
Chaudhuri, S. et al.; "A Primitive Operator for Similarity Joins in Data Cleaning"; Proceedings of the $22^{nd}$ International Conference on Data Engineering; 2006; 12 pages.
Cheng, et al.; "EntityRank: Searching Entities Directly and Holistically"; VLDB 2007; Sep. 23-28, 2007; Vienna, Austria; 12 pages.
Cohen, et al.; "Exploiting Dictionaries in Named Entity Extraction: Combining Semi-Markov Extraction Processes and Data Integration Methods"; KDD 2004; Aug. 22-25, 2004; Seattle, WA; 10 pages.
Dong, et al.; "Reference Reconciliation in Complex Information Spaces" SIGACM-SIGMOD 2005; Baltimore, MD; 12 pages.
Ganti, et al.; "Entity Categorization Over Large Document Collections"; KDD 2008; Aug. 24-27, 2008; Las Vegas, NV; pp. 274-282.
Gligorov et al.; "Using Google Distance to Weight Approximate Ontology Matches"; Proceedings of World Wide Web Conference; 2007; 2 pages.
Han, et al.; "Data Mining: Concepts and Techniques"; http://www.ir.iit.edu/~dagr/DataMiningCourse/Spring2001/BookNotes/4lang.pdf; Intelligent Database Systems Research Lab, School of Computing Science; Simon Fraser University; Canada; Jan. 17, 2001; 5 pages.
Hu; "ApproxSeek: Web Document Search Using Approximate Matchine"; The Fifth International Conference on Computer Science and Informatics; Sep. 1999; pp. 1-5.
Jones, et al.; "Generating Query Substitutions"; ACM; Proceedings of the $15^{th}$ International Conference on World Wide Web; May 2006; pp. 387-396.
Kasliwal, et al.; "Text Mining in Biomedical Literature"; http://www.cse.iitb.ac.in/sourabh/seminar/final/seminar_report; Department of Computer Science and Engineering, Indian Institute of Technology; Bombay, India; retrieved Mar. 9, 2009; 27 pages.
Koudas, et al.; "Record Linkage: Similarity Measures and Algorithms"; http://queens.db.toronto.edu/~koudas/docs/aj.pdf; Sep. 23, 2006; pp. 1-130.
Smeaton, et al.; "Experiments on Incorporating Syntactic Processinc of User Queries Into a Document Retrieval Strategy"; Proceedings of the $11^{th}$ Annual International ACM SIGIR Conference on Research and Development of Information Retrieval (SIGR'88); Jun. 1988; pp. 31-51.
Turney; "Mining the Web for Synonyms: PMI-IR versus LSA on TOEFL"; Institute for Information Technology, National Research Council of Canada; Ottawa, Canada; retrieved Mar. 5, 2009; pp. 1-12.
Schenkel, et al., "Efficient Top-k Querying over Social-Tagging Networks", Retrieved at << http://lca2srv30.epfl.ch/smichel/publications/sigir2008.pdf >>, Annual ACM Conference on Research and Development in Information Retrieval, Proceedings of the 31st annual international ACM SIGIR conference on Research and development in information retrieval, Jul. 20-24, 2008, pp. 8.
Tsoukalas, et al., "PLEDS: A Personalized Entity Detection System Based on Web Log Mining Techniques", Retrieved at << http://www2.fas.sfu.ca/pub/cs/techreports/2008/CMPT2008-06.pdf >>, WAIM, Proceedings of the 2008 the Ninth International Conference on Web-Age Information Management, Jul. 20-22, 2008, pp. 1-23.
Peters, et al., "Folksonomy and Information Retrieval", Retrieved at << http://wwwalt.phil-fak.uni-duesseldorf.de/infowiss/admin/public_dateien/files/1/1194344432asist_am07.pdf >>, Joining Research and Practice: Social Computing and Information Science, Proceedings of the 70th ASIS&T Annual Meeting, vol. 44, 2007, pp. 33.
Chirita, et al., "PTAG: Large Scale Automatic Generation of Personalized Annotation TAGs for the Web", Retrieved at << http://www.sw-china.org/wp-content/files/20074231202255102.pdf >>, International World Wide Web Conference, Proceedings of the 16th international conference on World Wide Web, May 8-12, 2007, pp. 845-854.
Chaudhuri, et al., "Exploiting Web Search to Generate Synonyms for Entities", Retrieved at << http://www2009.org/proceedings/pdf/p151.pdf >>, International World Wide Web Conference, Proceedings of the 18th international conference on World wide web, Apr. 20-24, 2009, pp. 151-160.
Chaudhuri, et al., "Mining Document Collections to Facilitate Accurate Approximate Entity Matching", Retrieved at << http://www.vldb.org/pvldb/2/vldb09-315.pdf >>, Proceedings of the VLDB Endowment, vol. 2, No. 1, Aug. 2009, pp. 12.
Agrawal, et al.; Exploiting web search engines to search structured databases; Proceedings of the $18^{th}$ International Conference on World Wide Web; Apr. 2009; pp. 501-510.
Agrawal, et al.; "Scalable Ad-hoc Entity Extraction from Text Collections"; Proceedings of the VLDB Endowment; vol. 1, Issue 1; Aug. 2008; pp. 945-957.
Baroni, et al.; "Using cooccurrence statistics and the web to discover synonyms in a technical language"; Proceedings of the LREC 2004; 2004; 4 pages.
Chang, et al., "Structured Databases on the Web: Observations and Implications"; ACM SIGMOD Record archive, vol. 33, Issue 3, 2004, 10 pages.
Chaudhuri, et al., "Robust and Efficient Fuzzy Match for Online Data Cleaning"; SIGMOD '03, Proceedings of the 2003 ACM SIGMOD International Conference on Management of Data , Jun. 9, 2003, 12 pages.
Chen, et al., "A Query Substitution-Search Result Refinement Approach for Long Query Web Searches"; IEEE/WIC/ACM International Joint Conferences on Web Intelligence and Intelligent Agent Technologies (WI-IAT), 2009, pp. 245-251.
Cheng, et al., "Entity Synonyms for Structured Web Search"; IEEE Transactions on Knowledge and Data Engineering, Jul. 29, 2011, pp. 1-15.
Cheng, et al., "Fuzzy Matching of Web Queries to Structured Data"; 2010 IEEE 26th International Conference on Data Engineering (ICDE), Mar. 2010, pp. 713-716.
Chklovski, et al., "VERBOCEAN: Mining the Web for Fine-Grained Semantic Verb Relations"; Proceedings of EMNLP 2004, 2004, 8 pages.
Cohen, et al., "XSEarch: A Semantic Search Engine for XML"; Proceedings of the 29th VLDB Conference, Berlin, Germany, 2003, 12 pages.
Craswell, et al., "Random Walks on the Click Graph"; Proceedings of the 30th Annual International ACM SIGIR Conference on Research and Development in Information Retrieval, 2007, 8 pages.
"Distributional Hypothesis"; retrieved at http://en.wikipedia.org/wiki/Distributional_hypothesis; retrieved on Mar. 1, 2011; Wikipedia online encyclopedia excerpt; 2 pages.
Dong, et al.; "Reference Reconciliation in Complex Information Spaces"; Proceedings of the 2005 ACM SIGMOD International Conference on Management of Data; 2005; pp. 85-96.
"Enterprise software"; retrieved at http://en.wikipedia.orp/wiki/Enterprise_software; retrieved on Jun. 19, 2012; Wikipedia article; 3 pages.
"Foundations of Statistical Natural Language Processing," retrieved on Jul. 4, 2012, companion website to the book: Foundations of Statistical Natural Language Processing, Manning, et al., MIT Press, Jun. 18, 1999, 2 pages.

(56) References Cited

OTHER PUBLICATIONS

Fuxman, et al., "Using the Wisdom of the Crowds for Keyword Generation"; Proceedings of the 17th International Conference on World Wide Web, Apr. 21-25, 2008; Beijing, China; pp. 61-70.

Graupmann, J.; "Concept-Based Search on Semi-Structured Data Exploiting Mined Semantic Relations"; EDBT 2004 Workshops, LNCS 3268, Eds. W. Lindner et al., Springer-Verlag, Berlin Heidelberg, 2004, pp. 34-43.

Guo, et al., "Named Entity Recognition in Query"; Proceedings of the 32nd International ACM SIGIR Conference on Research and Development in Information Retrieval, Jul. 2009, pp. 267-274.

Isard, et al., "Dryad: Distributed Data-Parallel Programs from Sequential Building Blocks"; EuroSys 2007, 2007, 14 pages.

Jain, et al., "Domain-Independent Entity Extraction from Web Search Query Logs"; Proceedings of the 20th International Conference Companion on World Wide Web, Mar. 28, 2011, pp. 63-64.

Jones, et al., "Generating Query Substitutions," Proceedings of the 15th International Conference on World Wide Web, 2006, pp. 387-396.

Kim, et al.; "A comparison on collocation-based similarity measures in query expansion"; Information Processing and Management; No. 35; 1999; pp. 19-30.

Malekian, et al., "Optimizing Query Rewrites for Keyword-Based Advertising"; ACM Conference on Electronic Commerce (EC), Chicago, Illinois, Jul. 8-12, 2008; pp. 10-19.

Mei, et al., "Query Suggestion Using Hitting Time"; Proceedings of the 17th ACM Conference on Information and Knowledge Management, Oct. 2008, pp. 469-477.

"Microsoft Research Techfest 2012: Projects"; retrieved at http://research.microsoft.com/en-us/events/techfest2012/projects.aspx; retrieved on Apr. 10, 2012; Microsoft Corporation; Redmond, WA; 7 pages.

Miller, G., "WordNet: A Lexical Database for English"; Communications of the ACM, vol. 38, No. 11, Nov. 1995, pp. 39-41.

Minjuan, et al., "Pseudo-Relevance Feedback Driven for XML Query Expansion"; Journal of Convergence Information Technology, vol. 5, No. 9, Nov. 2010, pp. 146-156.

Navarro, Gonzalo, "A Guided Tour to Approximate String Matching"; ACM Computing Surveys, vol. 33, Issue 1, Mar. 2001, pp. 31-88.

Pantel, et al., "Web-Scale Distributional Similarity and Entity Set Expansion"; Proceedings of the 2009 Conference on Empirical Methods in Natural Language Processing, Aug. 2009, pp. 938-947.

Pasca, M.; "Weakly-Supervised Discovery of Named Entities Using Web Search Queries"; Proceedings of the Sixteenth ACM Conference on Information and Knowledge Management; Nov. 2007; pp. 683-690.

Sarkas, et al., "Structured Annotations of Web Queries"; Proceedings of the 2010 International Conference on Management of Data, Jun. 2010, pp. 771-782.

Strube, et al., "WikiRelate! Computing Semantic Relatedness Using Wikipedia," AAAI Press, 2006, 6 pages.

Wen, et al., "Clustering User Queries of a Search Engine"; Proceedings of the 10th International Conference on World Wide Web, 2001, pp. 162-168.

Yakout, et al.; "InfoGather: Entity Augmentation and Attribute Discovery by Holistic Matching with Web Tables"; Proceedings of the 2012 International Conference on Management of Data; May 2012; pp. 97-108.

Zhai, et al., "A Study of Smoothing Methods for Language Models Applied to Ad Hoc Information Retrieval"; Proceedings of the 24th Annual International ACM SIGIR Conference on Research and Development in Information Retrieval, 2001, 9 pages.

U.S. Appl. No. 61/606,481, filed Mar. 5, 2012; 41 pages.

U.S. Appl. No. 13/413,179, filed Mar. 6, 2012; 54 pages.

U.S. Appl. No. 13/527,601, filed Jun. 30, 2012; 58 pages.

Notice of Allowance Dated Jan. 21, 2014 From U.S. Appl. No. 13/487,260, filed Jun. 4, 2012, Inventor Tao Cheng.

Cohen, et al., "Learning to Match and Cluster Large High-Dimensional Data Sets for Data Integration", In Proceedings of the Eighth ACM SIGKDD International Conference on Knowledge Discovery and Data Mining, Jul. 23-26, 2002, 6 pages.

Sarawagi, Sunita, "Models and Indices for Integrating Unstructured Data with a Relational Database", In Proceedings of the Workshop on Knowledge Discovery in Inductive Databases, Sep. 20, 2004, 10 pages.

Schallehn, et al., "Efficient Similarity-based Operations for Data Integration", In Journal of Data & Knowledge Engineering, vol. 48, Issue 3, Aug. 12, 2003, 27 pages.

Berlin, et al., "TupleRank: Ranking Discovered Content in Virtual Databases", In Proceedings of 6th International Conference on Next Generation Information Technologies and Systems, Jul. 4-6, 2006, 15 pages.

Madhavan, et al., Corpus-based Schema Matching, 21st International Conference on Data Engineering, Apr. 5-8, 2005, 12 pages.

Venetis, et al., "Recovering Semantics of Tables on the Web", Proceedings of the VLDB Endowment, vol. 4, Issue 9, Jun. 2011, 10 pages.

Ganjam, et al., "InfoGather: Entity Augmentation and Attribute Discovery by Holistic Matching with Web Tables", SIGMOD '12, May 20-24, 2012, Scottsdale AZ, 12 pages.

Bahman, et al., "Fast Personalized Pagerank on Mapreduce", In SIGMOD, Jun. 12-16, 2011, Athens, Greece, 12 pages.

Ghani, et al., "Text Mining for Product Attribute Extraction", SIGKDD Explorations, vol. 8, Issue 1, Jun. 2006, 8 pages.

Bernstein, et al., Generic Schema Matching, Ten Years Later. In VLDB Endowment, vol. 4, No. 11, 2011, 7 pages.

Cafarella, et al., Data Integration for the Relational Web. VLDB, Aug. 24-28, 2009, Lyon, France, 12 pages.

Cafarella, et al., Webtables: Exploring the Power of Tables on the Web, PVLDB, 2008, 12 pages.

Cafarella, et al., "Uncovering the Relational Web", In WebDB, Jun. 13, 2008, Vancouver, Canada, 6 pages.

Doan, et al., "Reconciling Schemas of Disparate Data Sources: A Machine-Learning Approach", In ACM SIGMOD, May 21-24, 2001, 12 pages.

Elsayed, et al., "Pairwise Document Similarity in Large Collections with Mapreduce", In ACL, Jun. 2008, 4 pages.

Gupta, et al., "Answering Table Augmentation Queries from Unstructured Lists on the Web", Proc. VLDB Endowment, Aug. 24-28, 2009, Lyon France, 12 pages.

He, et al., "Statistical Schema Matching Across Web Query Interfaces", In SIGMOD 2003, Jun. 9-12, 2003, San . Diego, CA, 12 pages.

He, et al., "Seisa: Set Expansion by Iterative Similarity Aggregation", In WWW, Mar. 28-Apr. 1, 2011, Hyderabad, India, 10 pages.

Limaye, et al., "Annotating and Searching Web Tables Using Entities, Types and Relationships", VLDB Endowment, vol. 3, No. 1, 2010, 10 pages.

Madhavan, et al., "Generic Schema Matching with Cupid", 27th VLDB Conference, 2001, Roma, Italy, 10 pages.

Page, et al., The Pagerank Citation Ranking: Bringing Order to the Web. Technical Report, Stanford InfoLab, 1998, 17 pages.

Rahm, et al., "A Survey of Approaches to Automatic Schema Matching", The VLDB Journal, 2001, 24 pages.

Yin, et al., "Facto: A Fact Lookup Engine Based on Web Tables", In WWW, Mar. 28-Apr. 1, 2011, Hyderabad, India, 10 pages.

"International Search Report and Written Opinion", PCT/US2013/027203 mailed Jun. 26, 2013, 10 pages.

Loser et al., Augmenting Tables by Self-Supervised Web Search, M. Castellanos, U. Dayal, and V. Markl (Eds.): BIRTE 2010, LNBIP 84, pp. 84-99, 2011.

Feldman et al., "Self-supervised Relation Extraction from the Web," F. Esposito et al. (Eds.): ISMIS 2006, LNAI 4203, pp. 755-764, 2006.

Banko et al, "Open Information Extraction from the Web", Commun. ACM 51, 12 (Dec. 2008), 68-74.

Urbansky et al., "Entity Extractions from the Web with WebKnox," V. Snasel et al. (Eds.): Advances in Intelligent Web Mastering—2, AISC 67, pp. 209-218.

"Response to the Nov. 3, 2011 Non-Final Office Action," From U.S. Appl. No. 12/478,120, filed Feb. 2, 2012.

(56) References Cited

OTHER PUBLICATIONS

"Response to the Feb. 27, 2012 Final Office Action," From U.S. Appl. No. 12/478,120, filed Jun. 27, 2012.

"Preliminary Report on Patentability", From PCT Application No. PCT/US2013/027203 Mailed Sep. 9, 2014.

"PageRank," retrieved at <<http://en.wikipedia.org/wiki/PageRank>>, Wikipedia article, retrieved on Sep. 11, 2008.

Arasu, et al., "PageRank Computation and the Structure of the Web: Experiments and Algorithms," retrieved at <<http://www2002.org/CDROM/poster/173.pdf>>, Proceedings of the Eleventh International World Wide Web Conference, 2002, 5 pages.

Artiles, et al., "WePS-3 Evaluation Campaign: Overview of the Web People Search Clustering and Attribute Extraction Tasks," retrieved at <<http://citeseerx.ist.psu.edu/viewdoc/download?doi=10.1.1.174.3094&rep=rep1&type=pdf>>, Proceedings of CLEF, 2010, 15 pages.

Bhattacharya, et al., "Collective Entity Resolution in Relational Data," retrieved at <<http://linqs.cs.umd.edu/basilic/web/Publications/2007 /bhattacharya:tkdd07 /bhattacharya-tkdd.pdf>>, ACM Transactions on Knowledge Discovery from Data, vol. 1, No. 1, 2007, 35 pages.

Brin, et al., "The Anatomy of a Large-Scale Hypertextual Web Search Engine," retrieved at <<http://www.cs.panam.edu/-creilly/courses/CSCl6175-F11/papers/Brin-1998.pdf>>, Proceedings of the Seventh International Conference on World Wide Web 7, 1998, 20 pages.

Bunescu, et al., "Using Encyclopedic Knowledge for Named Entity Disambiguation," retrieved at <<http://www.cs.utexas.edu/-ml/papers/encyc-eacl-06.pdf>>, Proceeding of the 11th Conference of the European Chapter of the Association of Computational Linguistics, 2006, 8 pages.

Chakaravarthy, et al., "Efficiently Linking Text Documents with Relevant Structured Information," retrieved at <<http://www.vldb.org/conf/2006/p667-chakaravarthy.pdf>>, VLDB '06, Proceedings of the 32nd International Conference on Very Large Data Bases, 2006, pp. 667-678.

"Final Office Action and Examiner Initiated Interview Summary," From U.S. Appl. No. 12/465,832, Mailed Oct. 21, 2013.

Watanabe, et al., "A Graph-based Approach to Named Entity Categorization in Wikipedia Using Conditional Random Fields," retrieved at <<http://www.aclweb.org/anthology-new/D/D07/D07-1068.pdf>>, Proceedings of the 2007 Joint Conference on Empirical Methods in Natural Language Processing and Computational Natural Language Learning, Jun. 2007, pp. 649-657.

Cucerzan, Silviu, "Large-Scale Named Entity Disambiguation Based on Wikipedia Data," retrieved at <<http://acl.ldc.upenn.edu/D/D07/D07-1074.pdf>>, Proceedings of the 2007 Joint Conference on Empirical Methods in Natural Language Processing and Computational Natural Language, 2007, pp. 708-716.

Dill, et al., "SemTag and Seeker: Bootstrapping the Semantic Web Via Automated Semantic Annotation," retrieved at <<http://what.csc.villanova.edu/-cassel/901 OSemanticWeb/SemTag%20and%20Seeker%20Bootstrapping%20the%20semantic%20web%20via%20automated%20semantic%20annotation.pdf>>, Proceedings of the 12th International Conference on World Wide Web, 2003, 9 pages.

Gale, et al., "One Sense Per Discourse," retrieved at <<http://citeseerx.ist.psu.edu/viewdoc/download;jsessionid=8EA215CD07B134CA243A22FF6DDA2871?doi=10.1.1.178.2723&rep=rep1 &type=pdf>>, Proceedings of the Workshop on Speech and Natural Language, 1992, pp. 233-237.

Gentile, et al., "Graph-based Semantic Relatedness for Named Entity Disambiguation," retrieved at <<http://staffwww.dcs.shef.ac.uk/people/J.Iria/iria_s3t09.pdf>>, Proceedings of the 1st International Conference on Software, Services and Semantic Technologies (S3T), Oct. 2009, 8 pages.

Gooi, et al., "Cross-Document Coreference on a Large Scale Corpus," retrieved at <<http://acl.ldc.upenn.edu/hlt-naacl2004/main/pdf/177_Paper.pdf>>, In HLT-NAACL, 2004, 8 pages.

Han, et al., "Collective Entity Linking in Web Text: A Graph-Based Method," retrieved at <<http://www.nlpr.ia.ac.cn/2011papers/gjhy/gh133.pdf>>, Proceedings of the 34th International ACM SIGIR Conference on Research and Development in Information Retrieval, Jul. 2011, pp. 765-774.

Han, et al., "Named Entity Disambiguation by Leveraging Wikipedia Semantic Knowledge," retrieved at <<http://avss2012.org/cip/ZhaoJunPublications/paper/CIKM2009.NED.pdf>>, Proceedings of the 18th ACM Conference on Information and Knowledge Management, 2009, 10 pages.

Hoffart, et al., "Robust Disambiguation of Named Entities in Text," retrieved at <<http://aclweb.org/anthol ogy-new/D/D11/D11-1072.pdf>>, Proceedings of the 2011 Conference on Empirical Methods in Natural Language Processing, Jul. 2011, pp. 782-792.

Kulkarni, et al., "Collective Annotation of Wikipedia Entities in Web Text," retrieved at <<http://www.cc.gatech.edu/-zha/CSE8801 /query-annotation/p457-kulkarni.pdf>>, Proceedings of the 15th ACM SIGKDD International Conference on Knowledge Discovery and Data mining, 2009, pp. 457-465.

Mann, et al., "Unsupervised Personal Name Disambiguation," retrieved at <<http://citeseerx.ist.psu.edu/viewdoc/download?doi=10.1.1.10.7097&rep=rep1&type=pdf>>, Proceedings of the Seventh Conference on Natural Language Learning at HLT-NAACL 2003, vol. 4, 2003, 8 pages.

Mihalcea, et al., "Wikify! Linking Documents to Encyclopedic Knowledge," retrieved at <<http://www.cse.unt.edu/-rada/papers/mihalcea.cikm07.pdf>>, Proceedings of the Sixteenth ACM Conference on Conference on Information and Knowledge Management, 2007, 9 pages.

Mihalcea, Rada, "Unsupervised Large-Vocabulary Word Sense Disambiguation with Graph-based Algorithms for Sequence Data Labeling," retrieved at <<http://www.aclweb.org/anthology-new/H/H05/H05-1052.pdf>>, Proceedings of Human Language Technology Conference and Conference on Empirical Methods in Natural Language Processing (HLT/EMNLP), Oct. 2005, pp. 411-418.

Milne, et al., "Learning to Link with Wikipedia," retrieved at <<http://citeseerx.ist.psu.edu/viewdoc/download?doi=10.1.1.148.3617&rep=rep1&type=pdf>>, Proceedings of the 17th ACM Conference on Information and Knowledge Management, 2008, 10 pages.

Nadeau, et al., "Unsupervised Named-Entity Recognition: Generating Gazetteers and Resolving Ambiguity," retrieved at <<http://cogprints.org/5025/1/NRC-48727.pdf>>, Proceedings of 19th Conference of the Canadian Society for Computational Studies of Intelligence, Jun. 7, 2006, pp. 266-277.

Sarmento, et al., "An Approach to Web-scale Named-Entity Disambiguation," accessible at <<http://sigarra.up.pt/feup/publs__pesquisa.show_publ_file?pct_gdoc_id=68610.>>, Proceedings of the 6th International Conference on Machine Learning and Data Mining in Pattern Recognition, 2009, 15 pages.

Wang, et al., "Targeted Disambiguation of Ad-hoc, Homogeneous Sets of Named Entities," retrieved at <<http://acm.org>>, Proceedings of the 21st International Conference on World Wide Web, Apr. 2012, pp. 719-728.

"Non-Final Office Action," From U.S. Appl. No. 13/487,260, Mailed Mar. 7, 2013.

"Response to the Mar. 7, 2013 Non-Final Office Action," From U.S. Appl. No. 13/487,260, filed Aug. 6, 2013.

"Response to the May 23, 2011 Non-Final Office Action," From U.S. Appl. No. 12/465,832, filed Aug. 16, 2011.

"Response to the Oct. 7, 2011 Final Office Action," From U.S. Appl. No. 12/465,832, filed Dec. 22, 2011.

"Response to the Apr. 10, 2012 Non-Final Office Action," From U.S. Appl. No. 12/465,832, filed Jul. 10, 2012.

"Response to the Sep. 19, 2012 Final Office Action," From U.S. Appl. No. 12/465,832, filed Dec. 18, 2012.

"Response to the Jun. 13, 2013 Non-Final Office Action," From U.S. Appl. No. 12/465,832, filed Jul. 30, 2013.

"Non-Final Office Action," From U.S. Appl. No. 12/465,832, Mailed Jun. 13, 2013.

Chaudhuri, et al., "Mining the Web to Facilitate Fast and Accurate Approximate Match", Proceedings of WWW2009, Apr. 20-24, 2009, pp. 1-10.

(56) References Cited

OTHER PUBLICATIONS

"Non-Final Office Action," From U.S. Appl. No. 12/235,635, Mailed: Feb. 16, 2011.
"Response to the Feb. 16, 2011 Non-Final Office Action," From U.S. Appl. No. 12/235,635, filed Jul. 18, 2011.
"Final Office Action," From U.S. Appl. No. 12/235,635, Mailed: Oct. 25, 2011.
"Response to the Oct. 25, 2011 Final Office Action," From U.S. Appl. No. 12/235,635, filed Jan. 27, 2012.
"Advisory Action," From U.S. Appl. No. 12/235,635, Mailed: Feb. 6, 2012.
"Response to the Oct. 25, 2011 Final Office Action," From U.S. Appl. No. 12/235,635, filed Mar. 25, 2012.
"Non-Final Office Action," From U.S. Appl. No. 12/235,635, Mailed: Nov. 18, 2013.
"Response to the Nov. 18, 2013 Non-Final Office Action," From U.S. Appl. No. 12/235,635, filed Feb. 17, 2014.
"Supplemental Amendment," From U.S. Appl. No. 12/235,635, filed Feb. 17, 2014.
"Notice of Allowance," From U.S. Appl. No. 12/235,635, Mailed: May 23, 2014.
"Notice of Allowance," From U.S. Appl. No. 12/235,635, Mailed: Aug. 29, 2014.
"Notice of Allowance," From U.S. Appl. No. 12/235,635, Mailed: Dec. 11, 2014.
Egenhofer, M.J., et al., "Determining Semantic Similarity Among Entity Classes from Difference Ontologies", IEEE Transactions on Knowldege and Data Engineering, vol. 15, No. 2, Mar. 1, 2003, pp. 442-456.
Voluntary Amendment Filed Feb. 28, 2015 From People's Republic of China Patent Application No. 201380013249.X, 8 pages.
"Non-Final Office Action," Mailed Jan. 15, 2015, From U.S. Appl. No. 13/413,179, 42 pages.
Han et al., "Mining Frequent Patterns without Candidate Generation" Proceedings of the 2000 ACM SIGMOD international Conference on Management of Data, pp. 1-12, 2000.
Klapaftis, et al., "Google & WordNet based Word Sense Disambiguation", Workshop on Learning & Extending Ontologies Bonn Germany, Aug. 2005, 5 pages.
Kowalski, et al., "Information Storage and Retrieval Systesm", Kluwer Academic Publishers, 2002, 36 pages.
Ananthanarayanan et al., "Rule Based Synonyms for Entity Extraction from Noisy Text", Proceedings of the Second Workshop on Analytics for Noisy Unstructured Text Data, pp. 31-38, 2008.
Appelt et al., "Introduction to Information Extraction Technology", Proceedings of the International Joint Conference on Artificial Intelligence Tutorial, 1999.
Arasu et al., "Transformation-Based Framework for Record Matching" Proceedings of the 24th IEEE International Conference on Data Engineering, pp. 40-49, 2008.
Arasu et al.,"Learning String Transformations from Examples", Proceedings of the Publication of Very Large Database Endowment, pp. 2(1):514-525, 2009.
Chaiken et al., "Scope: Easy and Efficient Parallel Processing of Massive Data Sets", Proceedings of Very Large Database Endowment, pp. 1(2):1265-1276, 2008.
Dagan et al., "Contextual Word Similarity and Estimation from Sparse Data", Computer Speech and Language, 9:123-152, 1993.
Dean et al., "MapReduce: Simplified Data Processing on Large Clusters", Communications of the ACM—50th Anniversary Edition, vol. 51 Issue 1, pp. 107-113, Jan. 2008.
Manning et al., Foundations of Statistical Natural Language Processing, The MIT Press, 1999.
Michelson et al., "Mining Heterogeneous Transformations for Record Linkage", IIWeb, pp. 68-73, AAAI Press, 2007.
Lafferty et al., "Conditional Random Fields: Probalistic Models for Segmenting and Labeling Sequence Data", Proceedings of the Eighteenth International Conference on Machine Learning, pp. 282-289, 2001.
Lin, Dekang, "Automatic Retrieval and Clustering of Similar Words", Proceedings of the 17th international Conference on Computational Linguistics, vol. 2, pp. 768-774, 1998.
"Notice of Allowance," Mailed Apr. 7, 2015, From U.S. Appl. No. 12/235,635, 16 pages.
"Non Final Office Action," Mailed Jan. 15, 2015, From U.S. Appl. No. 13/527,601, 10 pages.
"Response to Non Final Office Action Mailed Jan. 15, 2015," Filed Apr. 14, 2015, From U.S. Appl. No. 13/527,601, 12 pages.
"Response to Non-Final Office Action Mailed Jan. 15, 2015," Filed Apr. 15, 2015, From U.S. Appl. No. 13/413,179, 23 pages.
"Supplemental EP Search Report Rule 61," Mailed Mar. 4, 2015, From European Patent Application No. 13757813.4, 3 pages.
"Non-Final Office Action," Mailed Apr. 10, 2012, From U.S. Appl. No. 12/465,832, 16 pages.
"Final Office Action," Mailed Sep. 19, 2012, From U.S. Appl. No. 12/465,832, 18 pages.
"Final Office Action," Mailed on Oct. 7, 2011, From U.S. Appl. No. 12/465,832, 14 pages.
"Non-Final Office Action," Mailed on May 23, 2011, From U.S. Appl. No. 12/465,832, 19 pages.
"Final Office Action," Mailed Oct. 21, 2013, From U.S. Appl. No. 12/465,832, 20 pages.
"Notice of Allowance and Examiner's Amendment", Mailed Jun. 6, 2013, From U.S. Appl. No. 12/478,120, 12 pages.
"Final Office Action," Mailed on Feb. 27, 2012, From U.S. Appl. No. 12/478,120, 18 pages.
"Non-Final Office Action," Mailed on Nov. 3, 2011, From U.S. Appl. No. 12/478,120, 9 pages.
"Response to the Nov. 3, 2011 Non-Final Office Action," From U.S. Appl. No. 12/478,120, filed Feb. 3, 2012.
Pasquie, et al., Efficient Mining of Association Rules Using Closed Itemset Lattices, 1999 Elsevier Science Ltd., pp. 25-46.
Hipp, et al., "Algorithms for Association Rule Mining—A General Survery and Comparison", ACM SIGKDD Explorations Newletter vol. 2 Issue 1, Jun. 2000, pp. 58-64.
Cheng, et al., U.S. Appl. No. 13/487,260, "Robust Discovery of Entity Synonyms Using Query Logs," filed Jun. 4, 2012, 61 pages.
Non-Final Office Action mailed Jul. 30, 2015 from U.S. Appl. No. 13/527,601, 12 pages.
Notice of Allowance mailed May 22, 2015 from U.S. Appl. No. 12/235,635, 16 pages.
Notice of Allowance and Examiner Initiated Interview Summary mailed Jun. 17, 2015 from U.S. Appl. No. 13/413,179, 16 pages.
Non-Final Office Action mailed Sep. 12, 2013 from U.S. Appl. No. 13/531,493, 14 pages.
Applicant Initiated Interview Summary mailed Dec. 18, 2013 from U.S. Appl. No. 13/531,493, 3 pages.
Response filed Dec. 23, 2013 to Non-Final Office Action mailed Sep. 12, 2013 from U.S. Appl. No. 13/531,493, 14 pages.
Final Office Action mailed Feb. 3, 2014 from U.S. Appl. No. 13/531,493, 12 pages.
Response filed Apr. 30, 2014 to Final Office Action mailed Feb. 3, 2014 from U.S. Appl. No. 13/531,493, 13 pages.
Applicant Initiated Interview Summary mailed May 1, 2014 from U.S. Appl. No. 13/531,493, 3 pages.
Notice of Allowance and Examiner Initiated Interview Summary mailed Aug. 20, 2014 from U.S. Appl. No. 13/531,493, 22 pages.
Correction Notice of Allowability mailed Feb. 27, 2015 from U.S. Appl. No. 13/531,493, 3 pages.
Notice of Allowance mailed Mar. 18, 2015 from U.S. Appl. No. 13/531,493, 9 pages.
Notice of Allowance mailed Jul. 2, 2015 from U.S. Appl. No. 13/531,493, 5 pages.
International Search Report and Written Opinion mailed Feb. 13, 2014 from PCT Patent Application No. PCT/US2013/055500, 12 pages.
International Preliminary Report on Patentability and Written Opinion mailed Feb. 24, 2015 from PCT Patent Application No. PCT/US2013/055500, 9 pages.
Requirement for Restriction/Election mailed Sep. 12, 2011 from U.S. Appl. No. 12/478,120, 6 pages.

(56) References Cited

OTHER PUBLICATIONS

Response filed Oct. 12, 2011 to Requirement for Restriction/Election mailed Sep. 12, 2011 from U.S. Appl. No. 12/478,120, 4 pages.
Non-Final Office Action mailed Apr. 2, 2013 from U.S. Appl. No. 13/413,179, 30 pages.
Response filed Sep. 3, 2013 to Non-Final Office Action mailed Apr. 2, 2013 from U.S. Appl. No. 13/413,179, 15 pages.
Final Office Action mailed Dec. 5, 2013 from U.S. Appl. No. 13/413,179, 31 pages.
Response filed Jun. 5, 2014 to Final Office Action mailed Dec. 5, 2013 from U.S. Appl. No. 13/413,179, 19 pages.
Notice of Allowance mailed Oct. 17, 2013 from U.S. Appl. No. 13/487,260, 11 pages.
Examination Report mailed Mar. 11, 2015 from European Patent Application No. 13757813.4, 4 pages.
Response filed Apr. 8, 2015 to the Examination Report Mailed Mar. 11, 2015 from European Patent Application No. 13757813.4, 17 pages.
Requirement for Restriction/Election mailed Apr. 25, 2014 from U.S. Appl. No. 13/594,473, 6 pages.
Response filed Aug. 25, 2014 to Requirement for Restriction/Election mailed Apr. 25, 2014 from U.S. Appl. No. 13/594,473, 10 pages.
Non-Final Office Action mailed Sep. 11, 2014 from U.S. Appl. No. 13/594,473, 13 pages.
Amendment and Response filed Dec. 11, 2014 to Non-Final Office Action mailed Sep. 11, 2014 from U.S. Appl. No. 13/594,473, 13 pages.
Notice of Allowance and Examiner Initiated Interview mailed Jan. 14, 2015 from U.S. Appl. No. 13/594,473, 11 pages.
Amendment and Response filed Apr. 14, 2015 to Notice of Allowance mailed Jan. 14, 2015 from U.S. Appl. No. 13/594,473, 10 pages.
Non-Final Office Action mailed May 12, 2015 from U.S. Appl. No. 13/594,473, 6 pages.
Amendment and Response filed Aug. 12, 2015 to Non-Final Office Action mailed May 12, 2015 from U.S. Appl. No. 13/594,473, 10 pages.
Notice of Allowance mailed Aug. 26, 2015 from U.S. Appl. No. 13/594,473, 8 pages.
Aymerich et al., "Automatic Extraction of Entries for a Machine Translation Dictionary Using Bitexts," Machine Translation Summit XI, Sep. 10, 2007, 7 pages.
Haveliwala, Taher H., "Topic-Sensitive PageRank," WWW 2002, May 7-11, 2002, Honolulu, Hawaii, 10 pages.
Nie et al., "Unknown Word Detection and Segmentation of Chinese using Statistical and heuristic Knowledge," Communications of COLIPS, 1995, vol. 5, No. 1-2, pp. 47-57, 11 pages.
Rodriguez et al., "Determining Semantic Similarity among Entity Classes from Different Ontologies," IEEE Transactions on Knowledge and Data Engineering, vol. 15, Issue 2, Mar. 1, 2003, pp. 442-456, 15 pages.
Advisory Action, Examiner-Initiated Interview Summary and After Final Consideration Program Decision mailed May 31, 2016 from U.S. Appl. No. 13/527,601, 5 pages.
Bellahsene et al., "Schema Matching and Mapping," Springer-Verlag Berlin Heidelberg, 2011, located at <<http://www.springer.com/series15258>>, 326 pages.
Voluntary Amendment filed Jul. 1, 2015 from China Patent Application No. 201380044316.4, 10 pages.
Applicant-Initiated Interview Summary mailed Nov. 4, 2015 from U.S. Appl. No. 13/527,601, 4 pages.
Examiner-Initiated Interview Summary mailed Nov. 16, 2015 from U.S. Appl. No. 13/531,493, 2 pages.
Response filed Nov. 30, 2015 to Non-Final Office Action mailed Jul. 30, 2015 from U.S. Appl. No. 13/527,601, 16 pages.
Final Office Action mailed Mar. 11, 2016 from U.S. Appl. No. 13/527,602, 5 pages.
Request for After Final Consideration Program Request and Response mailed Apr. 27, 2016 to the Final Office Action mailed Mar. 11, 2016 from U.S Appl. No. 13/527,602, 14 pages.
First Office Action mailed Apr. 13, 2016 from China Patent Application No. 201380013249.X, 15 pages.
Non-Final Office Action mailed Apr. 5, 2016 from U.S. Appl. No. 14/864,430, 15 pages.
Naptali et al., "Integration of Topic Dependent Class Language Model and Cache-based Unigram Scaling", Interspeech, Feb. 26-27, 2010, 7 pages.
Response filed Jun. 24, 2016 to the Final Office Action mailed Mar. 11, 2016 from U.S. Appl. No. 13/527,602, 14 pages.
Notice of Allowance mailed May 16, 2016 from U.S. Appl. No. 13/531,493, 35 pages.
First Office Action mailed Jun. 22, 2016 from China Patent Application No. 201380044316.4, 9 pages.
Response filed Oct. 4, 2016 to the Non-Final Office Action Apr. 5, 2016 from U.S. Appl. No. 14/864,430, 10 pages.
Final Office Action mailed Oct. 26, 2016 from U.S. Appl. No. 14/864,430, 33 pages.
Second Office Action mailed Dec. 1, 2016 from Chinese Patent Application No. 201380013249.X, 6 pages.

\* cited by examiner

IDENTIFYING ENTITY SYNONYMS

BACKGROUND

Search engines on the internet enable users to quickly locate a desired internet site, subject, good, or service. Large databases are often used to connect a search query with a desired result. For example, vertical search engines, such as shopping search engines, rely heavily on a product database. When a user searches for a desired product, such as an Acme Products Inc. 10× Zoom Camera 350i, that product is located in the product database to provide the user with detailed information regarding the product. However, most users do not provide the entire product's name to a search engine. This can make it more difficult to locate in a database, requiring more complex and timely searches.

One approach to provide better search results is to expand a database with "synonyms" of product names that then match the query, such as various portions of the full product's title. However, many users often enter information that is not even part of a product's actual name. For example, the hypothetical new Acme Products camera used in the example above may have the ability to take pictures in infrared wavelengths. A user may learn this feature and enter a search query such as "Acme camera infrared", hoping to find out more information about the Acme 350i.

Providing an exhaustive list of descriptions of each product in a database can be laborious and expensive. In addition, significantly increasing the number of entries in a database to cover each possible product description can cause an exponential increase in the amount of computing time needed to search the database. This can limit the usefulness of using databases to respond to search queries.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. While certain disadvantages of prior technologies are noted above, the claimed subject matter is not to be limited to implementations that solve any or all of the noted disadvantages of the prior technologies.

Various embodiments are provided for identifying queries that are submitted to a search engine that are synonyms of a real world object or service or search target. A query log is stored in a database located on at least one computing device. The query log contains information relating to queries submitted to the search engine, the output of the search engine in response to each query, and the URL selected in the output. An entity is a canonical name submitted to the search engine for a real world object or service. A candidate generation module can select a candidate query in the query log that shares a click on a URL with the entity. A correlated tag module can divide the candidate query and the entity into subsets of the original query. The subsets are referred to as a set of phrase-tag pairs. A correlation measure, referred to as a mutual information value, can be made between the set of phrase-tag pairs for the candidate query and the set of phrase-tag pairs for the entity. A candidate filtering module can determine a click similarity value between the candidate query and the entity based on a set of URLs selected in the search engine in response to the outputs of the search engine for the candidate query and the entity. A tag similarity value is determined based on the mutual information values. A candidate query is selected as an entity synonym if the click similarity value and the tag similarity value are greater than predetermined thresholds respectively. The entity synonym is stored in an entity database to enable the entity synonym to be associated with the entity in search engine applications.

In an additional embodiment, a plurality of candidate synonym strings for an entity string is selected from a document collection. A set of phrase-tag pairs are identified for each string. A tag mutual information value is calculated for each phrase-tag pair in the set for each candidate synonym string. A tag similarity is measured between the tag mutual information values for the entity string and for the set for each candidate synonym string. Candidate synonym strings having a tag similarity value greater than a threshold value are selected as entity synonyms. As in the previous embodiment, the entity synonym is stored in an entity database to enable the entity synonym to be associated with the entity in search engine applications.

DETAILED DESCRIPTION

Figure 1:
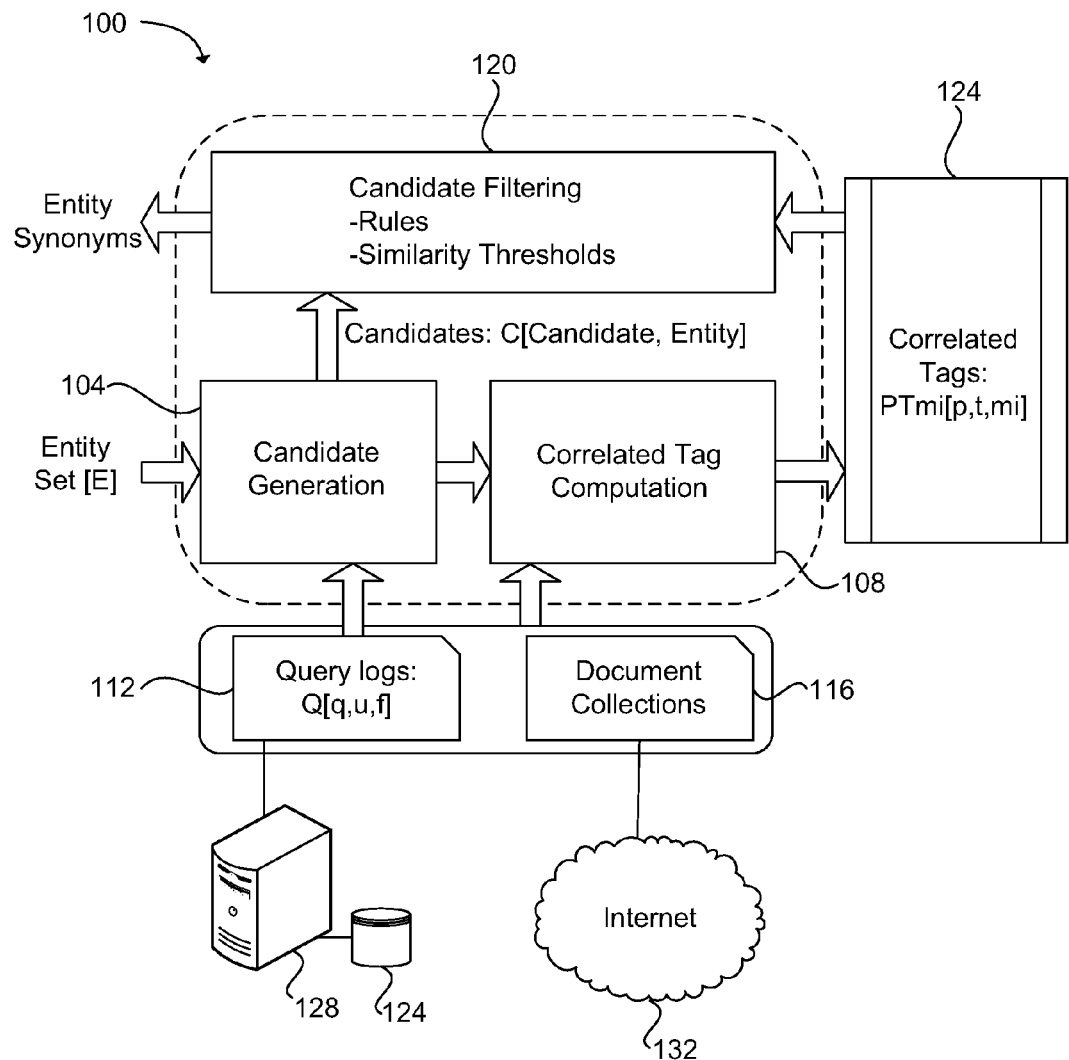
FIG. 1 is a block diagram illustrating an embodiment of a system for identifying an entity synonym of an entity.

Reference will now be made to the exemplary embodiments illustrated in the drawings, and specific language will be used herein to describe the same. It will nevertheless be understood that no limitation of the scope of the technology is thereby intended. Alterations and further modifications of the features illustrated herein, and additional applications of the embodiments as illustrated herein, which would occur to one skilled in the relevant art and having possession of this disclosure, are to be considered within the scope of the description.

As more commerce and business is accomplished using the internet, the ability to quickly locate goods and services on the web is becoming increasingly important. In addition, searching the web and providing advertising for products are valuable businesses on the web in themselves. The type of search query used can effect payment for advertising, the location of advertising, the location of a product in a search engine's results, and so forth.

For example, when Acme Products Inc. releases a new 10× zoom camera 350i, the company may use an advertising campaign on the internet to sell the product. Payments may be made to search engines to list the product high in a search for camera related searches. Payments may also be made to advertisers. For example, an advertiser may be paid to place a banner ad when certain keywords are entered in a search engine query, such as Acme 350i. In some search engines, the location of a result in the search may also depend on the popularity of the search language, i.e. how often a product or term is searched. However, when a wide number of different search queries are used to search for a single product, it can be difficult to link the multiple searches as being related to the single product.

The difficulty in associating a product with synonyms for the product can affect both the efficiency and placement of advertising on the internet, as well as the payment received by those providing advertising. For instance, when a fairly obscure search term for the Acme camera is used, web sites that sell the camera may be positioned low in the search results. In addition, a banner advertisement may not be displayed if the search query is not recognized as being related to the product. This can limit the income of both the seller of the product and the advertiser.

Determining when a search query is intended to refer to a selected product allows web search engines to provide special treatment by providing statistics and information about the product. For example, vertical search engines, such as the Microsoft Bing™ shopping search engine, provide this functionality for a variety of queries. The ability to recognize synonyms of products enables the products to be identified in a significantly larger percentage of search queries. This also enables a search engine to alter the query and include a canonical version of the product name found in a database to obtain more accurate results.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

The term "canonical" is used herein to refer to a standard or accepted phrase for a searched entity. However, it is possible that an entity may have a number of different canonical phrases, or different canonical terms depending on the search engine or web page that is marketing, displaying, or selling the entity. The "canonical" entity may be selected from a search engine query log.

The term "entity" is defined herein as a text string that refers to a real world object or service or search target. For example, the text string "Acme Products Inc. 10× Zoom Camera 350i" may be the canonical entity for an object marketed by Acme Products, Inc. In another example, the term "Acme Insurance, Inc. OneHealth Insurance Plan" may be the canonical entity for a service provided by Acme Insurance, Inc. There may be many different accepted canonical entities for each real world object or service. For instance, an object may have both a name and a part number that are considered canonical. An object may also have multiple different names that are considered canonical.

The term "synonym" is defined herein as a query text string that is intended to refer to the same entity as another query text string. For example, "Acme Products Inc. 10× Zoom Camera 350i", "Acme 10× Zoom Camera", "Acme 350i", and "Acme Camera Infrared" are all search terms that intend to refer to the fictitious 350i model camera marketed by Acme Products.

The term "token" is defined herein as a single word, number, or symbol in a query text string. A token is typically separated from other tokens in a query text string by spaces, but may also be separated by other means such as tabs, semicolons, commas, and so forth. A search string may include several tokens that are not separated. For example, a canonical search string may be "Acme Products Inc. 10× Zoom Camera 350i", containing the tokens "Acme", "Products", "Inc.", "10×", "Zoom", "camera", and "350i"; while a synonym search string may be "Acme350i", containing the tokens "Acme" and "350i".

The term "subset synonym" is defined herein as a synonym that contains only tokens that are in the canonical entity. For example, "Acme 350i" is a subset synonym of "Acme Products Inc. 10× Zoom Camera 350i".

The term "non-subset synonym" is defined herein as a synonym that contains tokens that are not in the canonical entity. For instance, "Acme camera infrared" is a non-subset synonym of "Acme Products Inc. 10× Zoom Camera 350i".

The term "click" or "clicked", as used herein, refers to a selection of a URL in an output of the search engine by a person or machine.

Various embodiments are described for identifying an entity synonym in a query text string using a query log of a search engine. The entity synonym can include non-subset synonyms as well as subset synonyms of a selected entity. An entity can be any query string in the query log that is determined to refer to a selected real world object or service. Once an entity has been determined, synonyms of the entity can be identified. An exemplary system can include a query log stored in a database located on at least one computing device. The query log can contain information regarding text strings (i.e. queries) entered into a search engine. The search engine typically responds to a query that has been entered into the search engine with an output comprising a list of hyperlinks. Each hyperlink is associated with a Uniform Resource Locator (URL). The URL that is selected by a user or machine can be associated with the query (i.e. the text string) in the query log. Thus, a relationship between the query and the corresponding URL that is selected as a result of the query can be related using the query log. When a different query is made, and the same URL is selected in response to the different query, it is referred to as sharing at least one click on a URL with the first query. A query that shares at least one click on a URL with an entity query is referred to as a candidate query that may be a synonym of the entity query. Thus, candidate queries in the query log can include subset synonyms, such as "Acme 350i" from the canonical entity "Acme Products Inc. 10× Zoom Camera 350i", as well as non-subset synonyms, such as "Acme camera infrared".

The challenge, however, is that a large number of queries in the query log may share a click on a URL with any given entity query. Out of these, a very small fraction of candidate queries may actually contain references to a synonym of the entity. To identify the relatively small fraction of candidate queries which also correspond to synonyms of an entity, two measures can be performed. One measure is to determine how related the candidate query is with an entity query. This can be accomplished by measuring the click similarity in the query log between the candidate query and the entity query. Second, a measurement can be made to determine how highly correlated the context of the candidate query string and the entity query string are.

To measure the context between the entity query and the candidate query, both the entity query and the candidate query can be divided into a set of "phrase-tag" pairs, where the tag is a portion of a candidate query and the phrase is the remainder of the candidate query. A statistical correlation measure of the context that is common between the entity query and the candidate query is then determined. In one embodiment, the context can be measured between each phrase-tag pair in the set of phrase-tag pairs for the entity query and each phrase-tag pair in the set of phrase-tag pairs in the candidate query, as shown in the equations below. One type of statistical correlation measure that can be made is to determine the mutual information in the sets. An equation to calculate the mutual information in the sets is shown below.

A tag similarity is measured based on the mutual information for the entity query and the candidate query. A click similarity is also measured between the entity query and the candidate query. The two queries are then determined to be synonyms if the measured similarity values are greater than a predetermined click threshold value and a tag threshold value.

Additional rule-based filtering may also be conducted. When the entity query and the candidate query meet selected rule-based filtering criteria, the threshold values for the click similarity and the tag similarity can be decreased while still providing a high probability that the candidate query is a synonym of the entity query.

Similarity Functions

Example similarity functions are now defined which can be used to characterize candidate synonym queries relative to an entity query.

Click Similarity

Information contained in one or more query logs for a search engine can be modeled as follows. The query log can consist of a set of triples: <q, u, f(q,u)>, where q is the query text string that a user (or machine) sends to a search engine, u is the Uniform Resource Locator (URL) string that is selected by the user or machine, based on an output of search results by the search engine, after the user or machine input the query q, and f(q,u) is the number of times that the u is clicked for the query q, as stored in the search log. Each time the URL is selected (i.e. clicked) after the query was input to the search engine, the search may have been performed by the same user or machine or a different user or machine. The triples are aggregated information of multiple searches which can be derived from search engine raw log data. The information may be obtained from one or more different databases containing the search engine data.

For each query q, a set of clicked URLs is denoted as U(q). A similarity between the set of clicked URLs for an entity query, U(q), and the set of clicked URLs for a candidate query U(q'), can be determined using a statistical method for comparing the similarity and diversity of sample sets. For example, a Jaccard index, also known as a Jaccard similarity coefficient, can be used to compare the similarity of the sets U(q) and U(q').

In one embodiment, a cosine similarity function can be used to determine a similarity between the set of clicked URLs for queries. The cosine similarity function is used to measure the similarity between two vectors of n dimensions by finding the angle between them. For a pair of queries q and q', the cosine similarity function can be used to measure the click similarity using the following equation:

$$Sim_{click}(q, q') = \frac{\sum_{u \in U(q) \cap U(q')} f(q, u) \times f(q', u)}{\sqrt{\sum_{u \in U(q)} f(q, u)^2 \times \sum_{u \in U(q')} f(q', u)^2}}.$$

In the example equation above, the output is normalized to have a value between 0 and 1. In other types of similarity functions, the output value may be an angle between the vectors.

Tag Similarity

The set of triples <q, u, f(q,u)> can be aggregated to <q, f(q)> by summing up all f(q,u) for each distinct q over all u. The pairs <q, f(q)> are referred to as an aggregated query log.

For each aggregated query log, <q, f(q)>, the query string can be divided into two parts: a phrase p and a tag t. In one embodiment, the tag t can be selected as an n-token prefix or an n-token suffix of the query string, n is an integer that is greater than zero (n=1, 2, 3, . . . ) representing the number of tokens in a tag, and p can be selected as the remaining tokens in the query after removing the tag tokens. In other words, the tag comprises the first or the last n tokens in a query string and the phrase is the remainder of the query string. If n is set to 1 and then 2, there are four different tags (2 prefix and 2 suffix). For example, for the query string "Acme Products Inc. 10× Zoom Camera 350i", the following set of phrase-tag pairs are derived for n=1 and 2, there are four phrase-tag pairs, as shown in Table A.

TABLE A

| Phrase | Tag |
| --- | --- |
| Products Inc. 10× Zoom Camera 350i | Acme |
| Acme Products Inc. 10× Zoom Camera | 350i |
| Inc. 10× Zoom Camera 350i | Acme Products |
| Acme Products Inc. 10× Zoom | Camera 350i |

This process can be extended to allow the tag to come from any portion of the query string, such as the middle of the string. The phrase can be the remaining portion of the query string.

For each phrase-tag pair, the aggregated query log <q, f(q)> can be re-written as <p, t, f(q)>. The number of URL clicks for each URL in the query data log is summed for each distinct phrase-tag pair (p,t) to form <p, t, f(p,t)>. It should be noted that, although the phrase p is a substring of a query q, the phrase p itself may be another query. For simplicity, the variable p can be replaced with q so that <p, t, f(p,t)> can be rewritten as <q, t, f(q,t)>.

For each query, the set of tags can be denoted as T(q). For each tag, the set of phrases can be denoted as Q(t). The sum of the frequency of clicks for all phrase-tag pairs in the query log can be denoted as:

$$F = \sum_{for\ all\ (q,s)} f(q, t).$$

A correlation measure made between the phrase-tag pairs in a first query string and the phrase-tag pairs in a second query string can be measured for the two different query strings to provide an additional metric to determine if the query strings are synonyms. In statistics, correlation is a member of a broad class of statistical relationships between two or more random variables or observed data values. In general, correlation can be thought of as a normalized measure of covariance.

In one embodiment, a correlation measure can be made by determining a mutual information (mi) value for each phrase-tag (q,t) pair for each of the query strings. For example, the mutual information value between each phrase-tag pair for a query string can be determined using the following example equation:

$$mi(q, t) = f(q, t) \log \left( \frac{F \times f(q, t)}{\sum_{t' \in T(q)} f(q, t') \times \sum_{q' \in Q(t)} f(q', t)} \right).$$

Using an example of phrase-tag pairs shown in Table B, a hypothetical number of clicks for each phrase (q), tag (t), and pair f (q,t) is provided for an example illustration. The f (q,t) value is the number of clicks for each URL in the database for the phrase (q) and the tag (t) pair. This information can then be used to measure the mutual information between each phrase tag pair in the example query using the equation above.

TABLE B

| Phrase (q) | Clicks f (q) | Tag (t) | Clicks f (t) | Clicks f (q, t) | mi (q, t) |
|---|---|---|---|---|---|
| Acme 350i | 62 | camera | 65 | 60 | 2.8 |
| Acme 350i | 62 | review | 105 | 55 | −11.4 |
| Acme 350i | 62 | lens | 115 | 61 | −10.0 |
| Acme Infrared | 130 | camera | 65 | 63 | −5.4 |
| Acme Infrared | 130 | lens | 115 | 103 | −12.4 |
| 350i lens | 120 | review | 105 | 98 | 22.9 |

Applying the numbers above for the phrase-tag pairs in the first row of Table B, the number of URL clicks f (q,t) in the query log for the phrase-tag pair "Acme 350i camera" is 60. The sum of the frequency of clicks for all phrase-tag pairs in the query log, F, is equal to 60+55+61+63+103+98=440 in this example The sum of the frequency of clicks f (q, t'), where t' is an element of the set of tags, T(q) for the query, is equal to the number of clicks for each time the tag "camera" appears in the table. Thus, it is equal to 65+65=130. The sum of the frequency of clicks f (q', t), where q' is an element of the set of phrases, Q(t), is equal to the clicks for each time the phrase "Acme 350i" is listed in the table. This is equal to 62+62+62=186. Using these values, the equation above becomes:

$$mi(q, t) = 60 \log\left(\frac{440 \times 60}{130 \times 186}\right) = 2.8.$$

The actual value attained in the example illustration above is not intended to be exemplary of a real world situation. Rather, it is only used to show an application of the equation. Additional types of correlation equations can also be used to measure the mutual information of the phrase-tag pairs. A mutual information value is calculated for each phrase-tag pair for a selected query.

A similarity between the mutual information values obtained for a pair of queries q and q' can be determined using a statistical method for comparing the similarity and diversity of sample sets. For example, a Jaccard index, also known as a Jaccard similarity coefficient, can be used to compare the similarity of the mutual information values for the tags of the pair of queries q and q'.

In one embodiment, a cosine similarity function can be used to determine a similarity between the pair of queries. The cosine similarity function is used to measure the similarity between two vectors of n dimensions by finding the angle between them. For a pair of queries q and q', a cosine similarity function, such as the equation below, can be used to measure the similarity of the mutual information values for the tags in the query.

$$Sim_{tag}(q, q') = \frac{\sum_{t \in T(q) \cap T(q')} mi(q, t) \times mi(q', t)}{\sqrt{\sum_{t \in T(q)} mi(q, t)^2 \times \sum_{t \in T(q')} mi(q', t)^2}}.$$

As in the $Sim_{click}$ equation, the output in the $Sim_{tag}$ example above is normalized to have a value between 0 and 1. In other types of similarity functions, the output value may be an angle between the vectors.

Assuming four tags are derived from a first query q and four tags from a second query q', hypothetical mutual information values for each phrase-tag pair for the queries are shown in the table below. While the tags are each labeled $t_1$ through $t_4$, it is assumed that the tags for each query may be different. In this example, it is assumed that the tags $t_2$ and $t_4$ for each query are the same, while tags $t_1$ and $t_3$ are different.

TABLE C

| | mi(q, t) | |
|---|---|---|
| | q | q' |
| $t_1$ | 70 | 95 |
| $t_2$ | 80 | 80 |
| $t_3$ | 60 | 71 |
| $t_4$ | 32 | 32 |

Applying the $Sim_{tag}$ equation above, the nominator is obtained by determining the sum of the intersection of T(q) and T(q') for mi (q,t) multiplied by mi (q',t). The intersection of T(q) and T(q') is the set that contains all elements of T(q) that also belong to T(q'). The intersection of the sets T(q) and T(q') is the mi(q,t) values of $t_2$ and $t_4$ in this example. So the nominator is equal to the sum of ($t_2$q×$t_2$q')+($t_4$q×$t_4$q'), or 80×32+80×32=5120. The denominator is the square root of the sum of each mi (q,t) value squared, where t is an element of the set T(q), multiplied by the sum of each mi (q',t) value squared, where t is an element of the set T(q'). The denominator becomes the square root of (($70^2+80^2+60^2+32^2$)× ($95^2+80^2+70^2+32^2$))$^{1/2}$=(15,924×21,349)$^{1/2}$=18,438. Thus, the $Sim_{tag}$(q,q')=5120/18,438=0.28. A determination can be made as to whether the query (q) and the query (q') are synonyms based on the values of the $Sim_{click}$ and $Sim_{tag}$ equations. If the calculated similarity values are greater than the selected threshold values then it is assumed that that the two queries are synonyms.

Architecture

An example architecture 100 for identifying an entity synonym in a query log is illustrated in FIG. 1. An overview of the architecture is described prior to discussing each of the components in detail. The architecture is comprised of three components. A candidate generation module 104 generates candidate phrases which may be synonyms of any one of a given set of entities. A correlated tag computation module 108 generates <phrase, tag, mi> triples where the phrase and tag are correlated and mi denotes their mutual information. The phrase and tag may be correlated with respect to a query log 112 or with respect to a document collection 116. The triples are output to a correlated tag module 124, where they are filtered based on their mutual information value. The candidate filtering module 120 can identify the synonyms from among the candidates generated by the candidate generation module.

Candidate Generation

The query logs 112 can be exploited to generate candidates for a given set E of entities. As previously discussed, if a candidate query q' is a synonym of an entity e, then there is a good probability that there are queries in the logs corresponding to each of the queries e and q' which will share at least one click on a URL. Candidate queries can be located in the query logs 112.

The query log 112 can be modeled as a set of triples <q, u, f(q,u)>. The query log may be stored in a database. Candidate queries that may contain synonyms of the given set E of entities can be selected from the query log using a declarative computer language, such as a structured query language (SQL). Other types of query languages may also be used to perform functions and queries on the query log, such as Java Persistence Query Language (JPQL) or Hibernate Query Language.

In one example implementation, a SQL query can be used to select the candidate queries from the query log 112 for the given set E of entities. The SQL query can be implemented in a map-reduce system such as Cosmos™. Other types of distributed computing systems configured to work with large data sets on clusters of computers, such as Teradata™, may also be used. In this example, it can be assumed that the query log Q is a relation Q[q,u,f] and the entity set E is a relation E[name].

```
SQL1:
Select R1.q AS Candidate, R2.q as Entity
From Q as R1, Q as R2, E
WHERE R2.q = E.name and R1.u = R2.u
GROUP BY R1.q, R2.q
```

The output of the candidate generation module 104 is a relation C[Candidate, Entity]. The similarity equations can then be used to determine which pairs are synonyms.

Correlated Tag Computation

The correlated tag computation module 108 is configured to compute correlated phrase and tag pairs. The output is a relation T[p,t,mi] where t[mi] is the mutual information between a phrase and a tag t. The correlated phrase and tag pairs may be filtered based on the mutual information value. The pairs which have a mutual information value that is less than a specified threshold may be discarded as having a very low probability of being an entity synonym. For instance, in one example, the mutual information values having a threshold less than zero can be discarded. Only those phrase and tag pairs which have positively correlated mutual information value may be kept. The actual threshold level can be selected based on system needs.

In general, the query logs or a document collection, such as Wikipedia™ or other documents available on the Internet, can be used to identify such correlated phrases and tags. An example technique for determining a mutual information value for phrase-tag pairs is described with respect to a query log and then extended for use with a document collection.

For instance, each query in a query log can be divided into phrase-tag pairs. The distinct phrases and tags can be identified in the query log. The occurrences of the phrases and tags can then be identified in the document collection. When a phrase and a tag both occur within the proximity of a document, a phrase-tag pair can be generated. This can be used to augment the phrase-tag pairs generated from the query log.

In one embodiment, a SQL query can be used to determine phrase-tag pairs for the candidate queries output by the candidate generation module 104. A mutual information value can then be determined for the phrase-tag pairs. The relation AggQ[q,f] can denote the aggregated query log. The set of triples <q, u, f(q,u)> can be aggregated to <q, f(q)> by summing up all f(q,u) for each distinct q over all u to form the aggregated query log. As previously discussed, q is the query text string that a user (or machine) sends to a search engine, u is the Uniform Resource Locator (URL) string that is selected, based on an output of the search engine, after inputting the query q, and f(q,u) is the number of times that u is clicked for the query q.

A relation Q'[p,t,f] is generated from the aggregated query log, where p is a phrase of the query q, t is a tag of the query q, and f is the number of times that a URL in the aggregated query log has been clicked for the phrase-tag pair. For each tuple [q,f] in AggQ, the tuples [p,t,f] are generated where (i) either concat (p,t) or concat (t,p) is equal to q, and (ii) t is non-empty and contains at most a constant number of tokens. For example, t may contain one or two tokens. Q' can be aggregated by summing up all of the f values for each phrase-tag pair. The summation provides the relation AggP [p,t,f(p,t)].

The summation AggP[p,t,f(p,t)] can then be filtered to retain the phrase-tag (p, t) pairs having a mutual information value greater than a selected threshold value. An example SQL query, labeled SQL2, follows. The SQL2 query describes the computation of the phrase-tag pairs with high mutual information to obtain the relation PTmi[p,t,mi]. The SQL2 query is first used to obtain the sum of f(p,t) in AggP.

```
SQL2:
SELECT SUM(f(p,t)) FROM AggP
The sum is donted by F.
SELECT PT.p, PT.t, PT.f(p,t)*log((PT.f(p,t)*F)/(P.f*T.f)) AS mi
FROM AggP AS PT,
(SELECT p, SUM(f(p,t)) AS f FROM AggP GROUP BY p) AS P,
(SELECT t, SUM(f(p,t)) AS f FROM AggP GROUP BY t) AS T
WHERE PT.p=P.p AND PT.t=T.t
HAVING mi>0
```

Candidate Filtering

An example is now provided to show how to filter the candidate synonyms for a given entity e. As previously discussed, two similarity measurements are used, click similarity and tag similarity, to filter the candidate synonyms. Other filtering mechanisms that can be used include rule-based filtering and subset-superset filtering.

Similarity-Based Filtering

Similarity-based filtering uses two thresholds to determine if a candidate synonym is a synonym of a given entity e. The two threshold values, as previously discussed, are click similarity ($th_{click}$) and tag similarity ($th_{tag}$). For each candidate pair (e, e'), the click similarity $Sim_{click}(e,e')$ is first computed. If $Sim_{click}(e,e') \geq th_{click}$ then the tag similarity value $Sim_{tag}(e,e')$ is computed using the mutual information values obtained from the correlated phrase-tag pairs. If $Sim_{tag}(e,e') \geq th_{tag}$ then the candidate synonym e' is considered to be a synonym of e.

A set of rules can also be applied to quantify rule-based synonyms. If the candidate pair (e,e') satisfy one or more of the rules then this provides additional evidence that the candidate synonym is a synonym of the entity e. With this additional evidence, the corresponding threshold values $th_{click}$ and $th_{tag}$ can be reduced. For example, with no additional rule based filtering, the threshold values may each be 0.95. These threshold values may be reduced by a selected amount, such as 0.025 for each rule that the candidate pair (e,e') satisfies. The values listed here are provided as examples and are not intended to infer an actual value to the threshold levels or the reduction amount for the rule based filtering. The actual threshold values can be selected based on the level of accuracy desired in determining a candidate synonym is a synonym of the entity e.

In one embodiment, different types of rules used in rule-based filtering may result in different reduction levels. Rules that provide a high level of probability that the candidate synonym is a synonym of the entity may enable a greater reduction in the threshold values than a rule that only provides a relatively small increase in the probability for the candidate synonym to be an actual synonym of the entity.

In one embodiment, the rules can be classified into categories. Several example rules are provided as follows.

1. Spelling: this is measured by string edit distance. The string edit distance may be measured using the Levenshtein distance metric. If the edit distance between e and e' is small (such as no larger than 1), then the candidate pair (e,e') is considered to satisfy the spelling rule.
2. Stemming: if the stemmed forms of e and e' are the same, then the candidate pair (e,e') is considered to satisfy the stemming rule.
3. Space: let nospace(e) be the result string by removing all spaces, tabs, or other delimiters between tokens in e. If nospace(e) is the same as nospace (e'), then the candidate pair (e,e') is considered to satisfy the space rule.
4. Abbreviation: suppose e consists of multiple tokens t1, t2, . . . , tk. If e' is concatenated by prefix (t1), prefix (t2) . . . , prefix (tk), wherein prefix(t) is a prefix-substring of t, then the candidate pair (e,e') is considered to satisfy the abbreviation rule.

Additional rules can also be applied to provide further evidence that the candidate synonym is a synonym of the entity e. The actual number of rules that are applied in rule-based filtering can be determined based on system needs. Systems having a need for greater accuracy in the determination of synonyms can use more rule-based filtering to increase the probability that a candidate synonym is an actual synonym of an entity e.

Lookup Versus Batch Processing

Candidate generation and filtering techniques can be implemented for both lookup and batch processing scenarios.

Lookup

In the lookup scenario, a user or machine can input a single entity name e and query all potential candidates synonyms e'. In order to enable efficient lookup of potential candidate synonyms online, the relation Q[q,u,f(q,u)] can be pre-processed. This relation is used for candidate generation to determine if the candidate synonym shares at least one click on a URL with an entity query. The pre-processing is used to output a new relation NormQ[q, u, nf(q,u)] from the query log, where nf(q,u) is a normalized weight of (q,u) which provides efficient computing of the cosine similarity. In one embodiment, nf(q,u) can be found using the equation:

$$nf(q, u) = \frac{f(q, u)}{\sqrt{\sum_{u' \in U(q)} f(q, u')^2}}$$

Using this normalized weight, the click similarity can be computed as follows.

$$Sim_{click}(q,q') = \Sigma_{u \in U(q) \cap U(q')} nf(q,u) \times nf(q',u)$$

Using this equation, the computation of click similarity does not require retrieving all u that co-occur with q. Instead, only u that co-occur with both q and q' are needed. A SQL query can be used to normalize the weight to generate the relation NormQ. One example of such a SQL query is shown as SQL3.

---
SQL3
SELECT Q.q, Q.u, Q.f(q,u)/QF.f AS nf(q,u)
FROM Q
(SELECT q, SQRT(SUM(f(q,u)$^2$)) AS f FROM Q GROUP BY q) AS QF
WHERE Q.q=QF.q
---

An example SQL query is shown as SQL4 to compute all candidate synonyms e' such that $Sim_{click}(e,e') \geq th_{click}$.

---
SQL4
SELECT R1.q AS e', R2.q AS e, SUM(R1.nf*R2.nf) AS SimClick
FROM NormQ AS R1, NormQ AS R2
WHERE R2.q = e AND R1.u = R2.u
GROUP BY e,e'
HAVING SimClick>=thClick
---

The output of SQL4 is a relation C[e',e, SimClick]. It can be observed that SQL4 combines two operations together: the candidate generation operation and the click similarity filtering operation. The results can be further filtered by tag similarity.

The relation PTmi[p, t, mi] can be pre-processed to for a normalized weight of the mutual information value mi. One example of pre-processing and normalization can be accomplished using the following equation.

$$nmi(p, t) = \frac{mi(p, t)}{\sqrt{\sum_{t' \in T(q)} mi(p, t')^2}}$$

An example of a SQL query to find the normalized mutual information value for a phrase-tag pair nmi(p,t) is shown as SQL5.

---
SQL5
SELECT PT.p, PT.t, PT.mi(p,t)/PF.f AS nmi(p,t)
FROM PTmi AS PT,
(SELECT p, SQRT(SUM(mi(p,t)$^2$)) AS f FROM PTmi GROUP BY p) AS PF
WHERE PT.p = PF.p
---

The normalized relation can be NormPTmi[p,t,nmi(p,t)]. The tag similarity filtering can also be achieved using a SQL query. One example of a SQL query to filter the tag similarity results is shown as SQL6.

---
SQL6
SELECT C.e', C.e, SUM(R1.nmi*R2 nmi) AS SimTag
FROM C, NormPTmi AS R1, NormPTmi AS R2, C
WHERE C.e' = R1.p AND C.e = R2.p AND R1.t = R2.t
---

```
           GROUP BY e,e'
           HAVING SimTag >=thTag
```

Batch Processing

The difference between batch processing and the lookup scenario is that in batch processing, the input is a set of entities E, instead of one single entity e, as in the lookup case. The input entity set can be denoted as a relation E[e]. In order to use batch processing, SQL4 can be changed to SQL7 as follows.

```
    SQL7
    SELECT R1.q AS e', R2.q as e, SUM(R1.nf*R2.nf) AS SimClick
    FROM NormQ AS R1, NormQ AS R2, E
    WHERE R2.q = E.E and R1.u = R2.u
    GROUP BY e,e'
    HAVING SimClick >=thClick
```

The SQL6 query can also be used to provide filtering on tag similarities for phrase-tag pairs of potential candidate synonyms for the set of entities E.

In accordance with the example embodiment illustrated in FIG. 1, a system for identifying an entity synonym of an entity is disclosed. The system is comprised of a query log 112 stored in a database 124 located on at least one computing device 128. In one embodiment, the database may be distributed on a computing system configured to work with large data sets on clusters of computers. The entity can be a selected query in the query log. A candidate generation module 104 is configured to select a candidate query in the query log which shares at least one click on a URL with the entity. In another embodiment, the candidate generation module can receive a set of entities and select each candidate query in the query log which shares at least one click on a URL with one of the entities in the set of entities. A correlated tag computation module 108 is configured to generate a set of phrase-tag pairs for the entity query and the candidate query. A mutual information value is measured for each phrase-tag pair, as previously discussed.

A candidate filtering module 120 is configured to determine a click similarity value between the candidate query and the entity based on a set of URLs that were selected in response to an output of the search engine for each of the candidate query and the entity. The candidate filtering module is also configured to determine a tag similarity value based on the mutual information values of the set of phrase-tag pairs for the candidate query and the entity. In one embodiment, the click similarity and the tag similarity values can be calculated using a cosine similarity function. The candidate query can then be selected as an entity synonym if the click similarity value and the tag similarity value are greater than a predetermined click threshold value and tag threshold value respectively.

In one embodiment, the information in the query log can be pre-processed to determine a normalized weight for the number of clicks on a URL for a query in the query log to enable efficient lookup of potential candidate synonyms. The normalized weight for the number of clicks may then be used in the cosine similarity function to determine the click similarity value for each candidate query. Similarly, the phrase-tag pairs can be preprocessed to determine a normalized weight of the mutual information value. The tag similarity value for each candidate query can be determined using the normalized weight of the mutual information value.

A number of rules can also be applied to a candidate query and the entity, as previously discussed. The click threshold values and the tag threshold value can be selected based on the number of rules that the candidate query and the entity satisfy.

Figure 2:
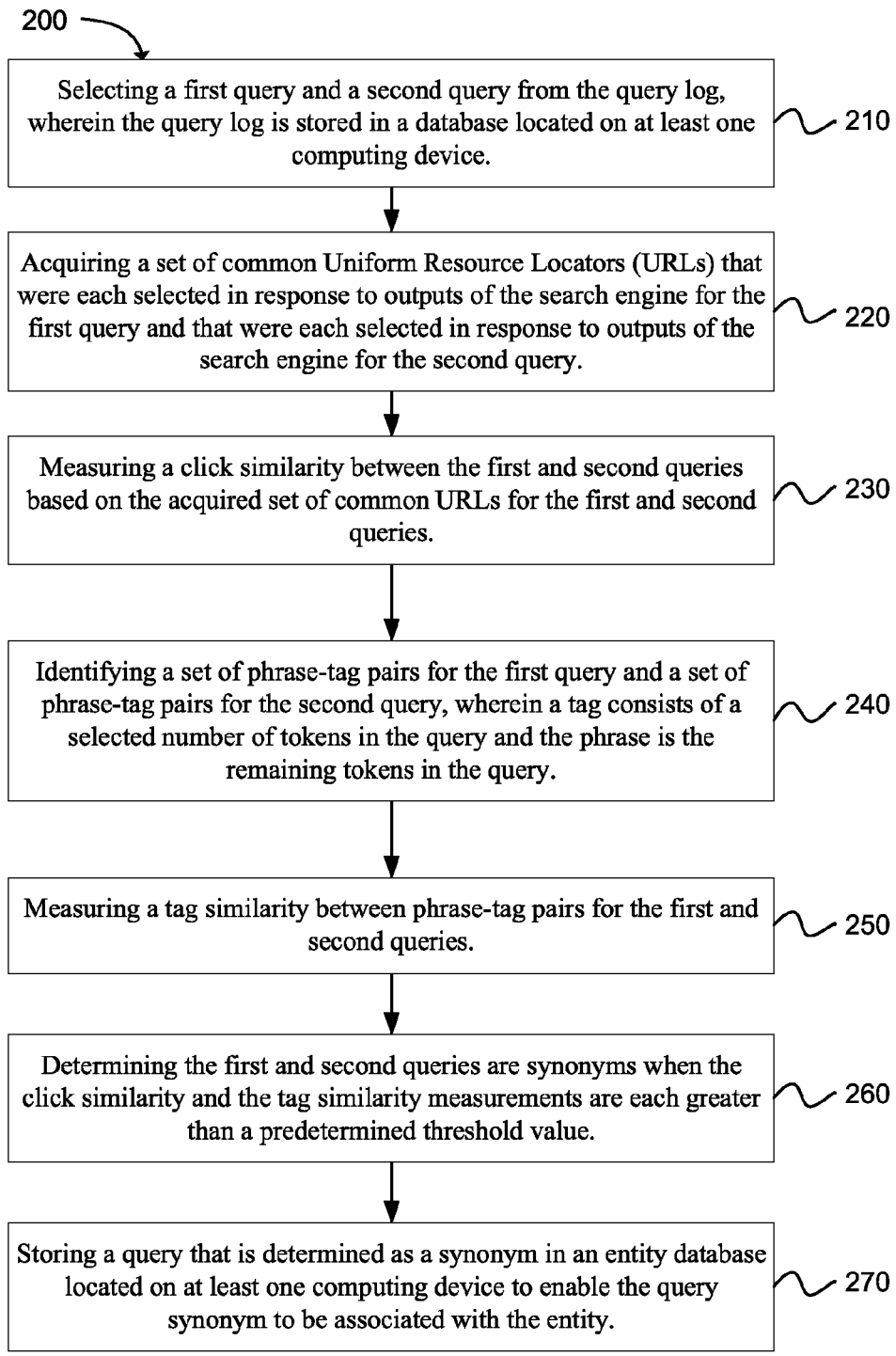
FIG. 2 is a flowchart illustrating an embodiment of a method for identifying an entity synonym of an entity in a query log for a search engine.

FIG. 2 illustrates an embodiment of a method 200 for identifying an entity synonym in a query log for a search engine. In an initial block 210, first and second queries are selected from the query log. The query log can be stored in a database located on at least one computing device. The database may be a relational database. As previously discussed, a query language, such as the structured query language, may be used to query the contents of the query log. In one embodiment, at least one of the first and second queries can be the entity. This enables a determination to be made as to whether the other query is a candidate synonym of the entity.

In block 220, a set of Uniform Resource Locators (URLs) are acquired for each of the first and second queries. For each query, the set of URLs are categorized that were selected in response to an output of the search engine for each of the first and second queries. For example, a user or a machine may enter a search query into a search engine. The search engine will then return a set of hyperlinks to sites that are determined by the search engine to be relevant to the search query. Each hyperlink is associated with a URL. The URL that is selected by the user or machine in response to the query is typically stored in the query log. The set of URLs that were selected in response to the outputs of the search engine for each of the first and second queries can be determined.

A click similarity between the first and second queries can be measured based on the acquired set of URLs for each of the first and second queries, as depicted in block 230. In one embodiment, the click similarity can be determined based on the number of times that a selected URL in the set of URLs was clicked for the first query and the number of times the selected URL was clicked for the second query. This determination can be made for each URL in the set of URLs for each of the first and second queries. A cosine similarity function can be used to determine a similarity between the set of clicked URLs for the first and second queries, as previously discussed.

In block 240, a set of phrase-tag pairs can be identified for the first query and a set of phrase-tag pairs can be identified for the second query. Each tag is comprised of a selected number of tokens in the query. The phrase contains the remaining tokens in the query. In one embodiment, each tag is comprised of one of n prefix tokens or n suffix tokens in the query, where n is an integer value greater than zero. The phrase is the remaining tokens in the query. Thus, for n=1, the tag can be the first token of the query or the last token of the query, and the phrase is the remaining tokens in the query. For n=2, the tag can be the first two tokens of the query or the two last tokens of the query, and the phrase is the remaining tokens in the query. The set may be comprised of phrase-tag pairs that include both the suffix tags and the prefix tags. Thus, for n=1 and n=2, the set can comprise four different phrase-tag pairs.

In block 250 the tag similarity between phrase-tag pairs for the first and second queries is measured. In one embodiment, the tag similarity can be measured using a cosine similarity function. Measuring the tag similarity can further comprise calculating a tag mutual information value for each phrase-tag pair in the set of phrase-tag pairs for each of the first and second queries. In one embodiment, measuring the tag similarity involves calculating a tag similarity value between the tag mutual information values for the set of phrase-tag pairs for the first query and the tag mutual information values for the set of phrase-tag pairs for the second query, as previously discussed.

A determination can be made as to whether the first and second queries are synonyms if the click similarity and the tag similarity measurements are each greater than a predetermined threshold value, as depicted in block 260. In block 270, a query that is determined as a synonym can be stored in an entity database. The entity database may be located on at least one computing device to enable the query synonym to be associated with the entity.

The ability to determine whether a query is a synonym of an entity enables more accurate search results to be displayed by the search engine. The location of the entity in the output of the search may be based on the number of times the entity has been entered in the search engine. By creating a more complete database of synonyms for the entity containing both subset and non-subset synonyms, a more accurate accounting can be made of the true number of searches for the entity by taking into account searches for synonyms of the entity. In other words, by summing all of the queries made for the entity and the query synonyms of the entity, a determination can be made as to the placement of the entity in the output of the search engine when placement is based on the number of queries made.

Similarly, advertisements in search engines are often associated with key words entered as queries in the search engine. By creating the more complete database of synonyms, an advertisement for the entity can be displayed at the output of the search engine when the query is a synonym query for the entity. This enables the entity to be better advertised, and the advertisement agency to profit more by displaying the advertisement for a broader range of entity synonyms.

Figure 3A:
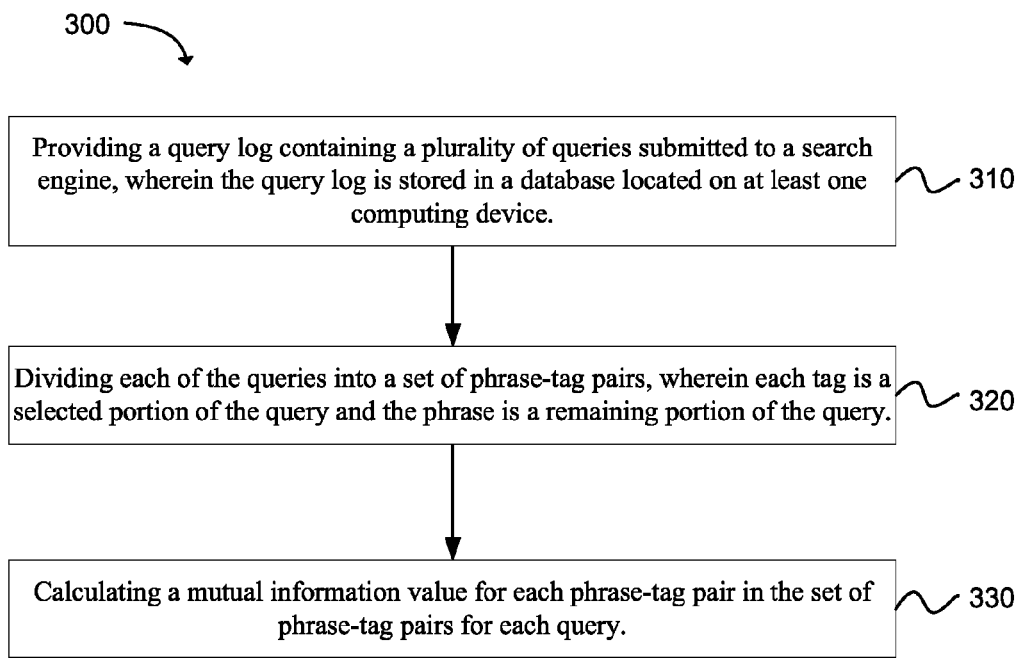
FIGS. 3a and 3b show a flowchart illustrating an embodiment of a method for identifying an entity synonym of an entity.
Figure 3B:
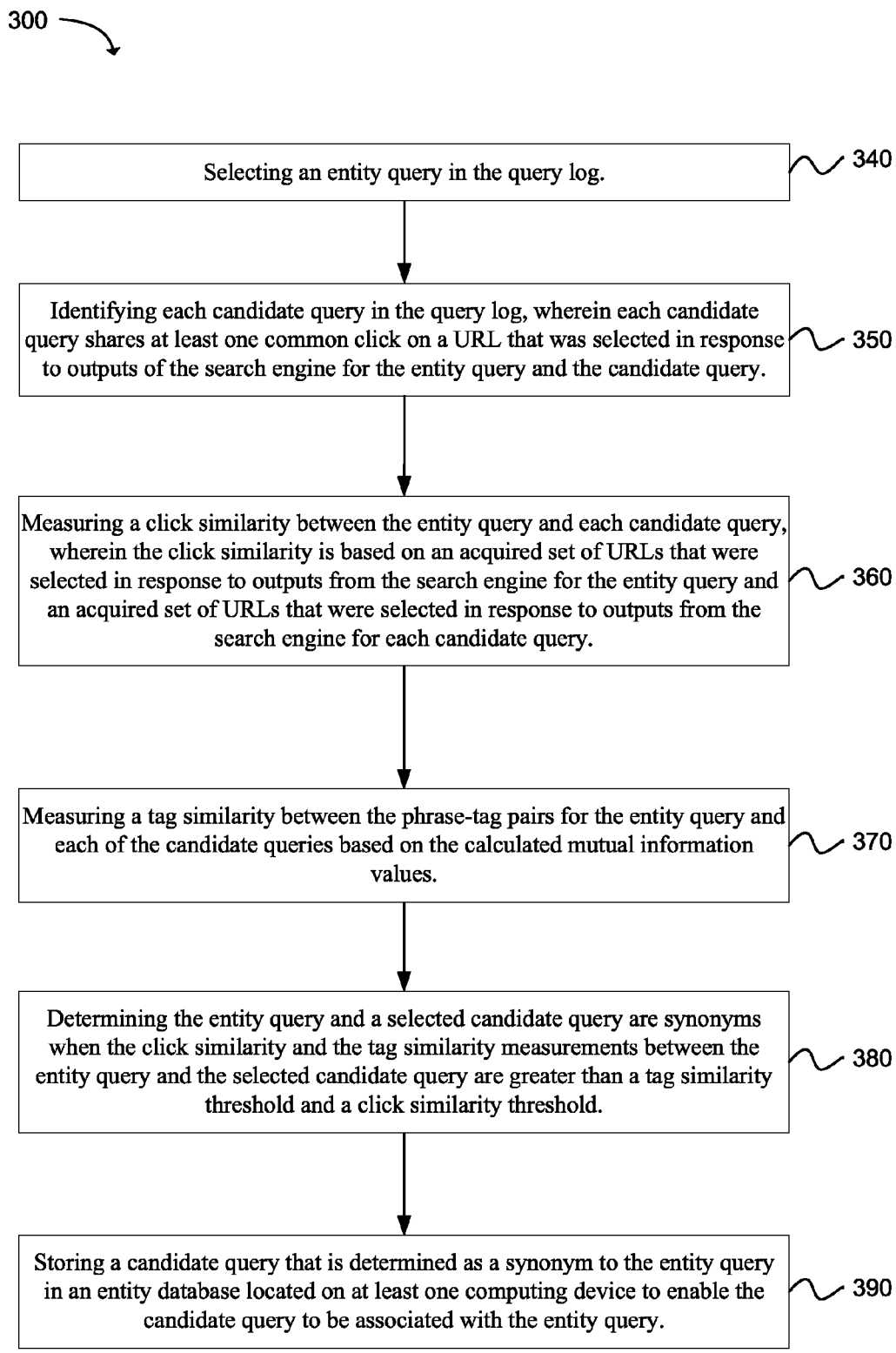

FIGS. 3*a* and 3*b* illustrate an embodiment of a method 300 for identifying an entity synonym an entity synonym of an entity. The method comprises providing a query log containing a plurality of queries submitted to a search engine, as depicted in block 310, as shown in FIG. 3*a*. The query log can be stored in a database located on at least one computing device. In block 320, each of the queries in the query log can be divided into a set of phrase-tag pairs. Each tag is a selected number of tokens in the query. The phrase is the remaining portion of the query. A mutual information value can be calculated for each phrase-tag pair in the set of phrase-tag pairs for each query, as shown in block 330. The process dividing each query into a set of phrase-tag pairs and determining the mutual information value for each phrase-tag pair can be accomplished using information in the query log.

The number of phrase-tag pairs can be reduced by eliminating those that have a mutual information value less than a selected threshold. For example, phrase-tag pairs having a negative mutual information value may be discarded. Moreover, additional phrase-tag pairs can be formed using a document collection, such as Wikipedia™ or other documents available on the Internet. For example, in one embodiment, if a document contains both a selected phrase from the set of phrase-tag pairs, as well as a tag, then an additional phrase-tag pair can be formed. The location of the phrase and tag relative to one another can be limited to a specific window size, such as within 10 tokens of each other. By increasing the number of phrase-tag pairs, the accuracy of the mutual information values can be increased.

FIG. 3*b* continues the flow chart of the method 300. The method 300 further comprises selecting an entity query in the query log, as depicted in block 340. In bock 350, each candidate query in the query log is identified. A candidate query is a query in the query log that shares at least one click on a URL that was selected in response to outputs of the search engine for the entity query and the candidate query. In other words, in response to an output of the search engine for the candidate query, a user or machine clicked on a selected URL. In response to an output of the search engine for the entity query, a user or machine clicked on the same URL.

In block 360, a click similarity is measured between the entity query and each candidate query based on an acquired set of URLs selected for the entity query and each candidate query. Each URL that was selected in response to an output of the search engine for the entity query is contained in one set. Each URL that was selected in response to an output of the search engine for a candidate query is contained in a set for that candidate query. The similarity between the sets is measured. In block 370, a tag similarity is measured between the phrase-tag pairs for the entity query and each of the candidate queries based on the calculated mutual information values. In bock 380, the entity query and a selected candidate query are determined to be synonyms when the click similarity and the tag similarity measurements between the entity query the selected candidate query are greater than a tag similarity threshold and a click similarity threshold. In block 390, the candidate query that is determined to be a synonym to the entity query is stored in an entity database located on at least one computing device to enable the candidate query to be associated with the entity query.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

Furthermore, the described features, structures, or characteristics may be combined in any suitable manner in one or more embodiments. In the preceding description, numerous specific details were provided, such as examples of various configurations to provide a thorough understanding of embodiments of the invention. One skilled in the relevant art will recognize, however, that the invention can be practiced without one or more of the specific details, or with other methods, components, devices, etc. In other instances, well-known structures or operations are not shown or described in detail to avoid obscuring aspects of the invention.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A method performed by a computing device, the method comprising:
   selecting, from a query log stored in a database, a first query associated with a first set of Uniform Resource Locators (URLs) returned by a search engine responsive to the first query and a second query associated with a second set of URLs returned by the search engine responsive to the second query;
   measuring a click similarity between the first query and the second query, the click similarity being measured based on similarity of first click behavior of users with respect to the first set of URLs to second click behavior of the users with respect to the second set of URLs;
   measuring first mutual information values between first phrases and first tags of the first query based on the first click behavior, wherein the first phrases and the first tags comprise different tokens of the first query;
   measuring second mutual information values between second phrases and second tags of the second query based on the second click behavior, wherein the second phrases and the second tags comprise different tokens of the second query;
   measuring a tag similarity between the first query and the second query using the first mutual information values and the second mutual information values;
   determining whether the first query and the second query are synonyms using both the click similarity and the tag similarity; and
   when the first query and the second query are determined to be synonyms, storing the second query as a query synonym of the first query.

2. The method of claim 1, further comprising setting predetermined threshold values for the click similarity and the tag similarity, and using the predetermined threshold values to determine whether the first query and the second query are synonyms.

3. The method of claim 1, wherein the tag similarity is measured by identifying:
   shared URLs that appear in both the first set and the second set;
   first other URLs that were clicked by the users that include the first phrases of the first query but do not include the first tags of the first query, and
   second other URLs that were clicked by the users that include the second phrases of the second query but do not include the second tags of the second query.

4. The method of claim 1, wherein measuring the first mutual information values includes determining numbers of clicks by the users on:
   shared URLs that are returned by the search engine responsive to the entire first query,
   other first URLs that are returned by the search engine responsive to other first queries that include the first phrases without the first tags, and
   further first URLs that are returned by the search engine responsive to further first queries that include the first tags without the first phrases.

5. The method of claim 4, wherein measuring the second mutual information values includes determining numbers of clicks by the users on:
   the shared URLs when returned by the search engine responsive to the entire second query,
   other second URLs that are returned by the search engine responsive to other second queries that include the second phrases without the second tags, and
   further second URLs that are returned by the search engine responsive to further second queries that include the second tags without the second phrases.

6. The method of claim 1, wherein measuring the click similarity includes determining numbers of clicks by the users on individual URLs in:
   the first set of URLs,
   the second set of URLs, and
   shared URLs that appear in both the first set and the second set.

7. The method of claim 6, wherein the first tags include first prefixes and first suffixes that appear in the first query with the first phrases, and the second tags include second prefixes and second suffixes that appear in the second query with the second phrases.

8. A system comprising:
   a machine-readable memory device or storage device storing instructions; and
   a hardware processor configured to execute the instructions,
   wherein the instructions, when executed by the hardware processor, cause the hardware processor to:
   select, from a query log stored in a database, a first query associated with a first set of Uniform Resource Locators (URLs) returned by a search engine responsive to the first query and a second query associated with a second set of URLs returned by the search engine responsive to the second query;
   measure a click similarity between the first query and the second query, the click similarity being measured based on similarity of first click behavior of users with respect to the first set of URLs to second click behavior of the users with respect to the second set of URLs;

measure first mutual information values between first phrases and first tags of the first query based on the first click behavior, wherein the first phrases and the first tags comprise different tokens of the first query;

measure second mutual information values between second phrases and second tags of the second query based on the second click behavior, wherein the second phrases and the second tags comprise different tokens of the second query;

measure a tag similarity between the first query and the second query using the first mutual information values and the second mutual information values;

determine whether the first query and the second query are synonyms using both the click similarity and the tag similarity; and when the first query and the second query are determined to be synonyms, store the second query as a query synonym of the first query.

9. The system of claim 8, wherein the first tags and second tags comprise context words that appear with the first phrases in the first query and that also appear with the second phrases in the second query.

10. The system of claim 8, wherein the tag similarity reflects similarity between the first mutual information values and the second mutual information values.

11. The system of claim 10, wherein the instructions, when executed by the hardware processor, cause the hardware processor to:

apply a cosine similarity function to the first mutual information values and the second mutual information values to determine the tag similarity.

12. A hardware memory device or hardware storage device comprising instructions which, when executed by a hardware processor, cause the hardware processor to perform acts comprising:

selecting, from a query log stored in a database, a first query associated with a first set of Uniform Resource Locators (URLs) returned by a search engine responsive to the first query and a second query associated with a second set of URLs returned by the search engine responsive to the second query;

measuring a click similarity between the first query and the second query, the click similarity being measured based on similarity of first click behavior of users with respect to the first set of URLs to second click behavior of the users with respect to the second set of URLs;

measuring first mutual information values between first phrases and first tags of the first query based on the first click behavior, wherein the first phrases and the first tags comprise different tokens of the first query;

measuring second mutual information values between second phrases and second tags of the second query based on the second click behavior, wherein the second phrases and the second tags comprise different tokens of the second query;

measuring a tag similarity between the first query and the second query using the first mutual information values and the second mutual information values;

determining whether the first query and the second query are synonyms using both the click similarity and the tag similarity; and when the first query and the second query are determined to be synonyms, storing the second query as a query synonym of the first query.

13. The hardware memory device or hardware storage device of claim 12, wherein the first phrase and the first tag are different substrings of the first query and the second phrase and the second tag are different substrings of the second query.

14. The hardware memory device or hardware storage device of claim 12, wherein the first phrase is different than the second phrase and the first tag is the same as the second tag.

15. The hardware memory device or hardware storage device of claim 14, wherein the first tag and the second tag are a single context word that appears after the first phrase in the first query and after the second phrase in the second query.

16. The hardware memory device or hardware storage device of claim 14, wherein the first tag and the second tag are a sequence of at least two context words that appear after the first phrase in the first query and after the second phrase in the second query.

17. The hardware memory device or hardware storage device of claim 14, wherein the first tag and the second tag are a single context word that appears before the first phrase in the first query and before the second phrase in the second query.

18. The hardware memory device or hardware storage device of claim 14, wherein the first tag and the second tag are a sequence of at least two context words that appear before the first phrase in the first query and before the second phrase in the second query.

19. The hardware memory device or hardware storage device of claim 18, wherein the tag similarity reflects an extent to which the first mutual information is similar to the second mutual information.

20. The hardware memory device or hardware storage device of claim 12, wherein the measuring the click similarity includes determining numbers of clicks by the users on individual URLs in:

the first set of URLs, the second set of URLs, and shared URLs that appear in both the first set and the second set.

* * * * *